(12) United States Patent
Baek et al.

(10) Patent No.: US 9,300,868 B2
(45) Date of Patent: Mar. 29, 2016

(54) IMAGE PROCESSING DEVICE AND SYSTEM OPERABLE IN A HIGH-QUALITY IMAGING MODE AND A POWER SAVING MODE

(71) Applicant: SAMSUNG ELECTRONICS CO., LTD., Suwon-Si, Gyeonggi-Do (KR)

(72) Inventors: Byung-Joon Baek, Goyang-Si (KR); Dong-Jae Lee, Osan-Si (KR); Tae-Chan Kim, Yongin-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 87 days.

(21) Appl. No.: 14/205,493

(22) Filed: Mar. 12, 2014

(65) Prior Publication Data

US 2014/0267845 A1 Sep. 18, 2014

(30) Foreign Application Priority Data

Mar. 12, 2013 (KR) ........................ 10-2013-0026036

(51) Int. Cl.
| | | |
|---|---|---|
| H04N 3/14 | (2006.01) | |
| H04N 5/335 | (2011.01) | |
| H04N 9/04 | (2006.01) | |
| H04N 5/232 | (2006.01) | |
| H04N 5/378 | (2011.01) | |
| H04N 5/228 | (2006.01) | |

(52) U.S. Cl.
CPC ....... *H04N 5/23241* (2013.01); *H04N 5/23206* (2013.01); *H04N 5/23245* (2013.01); *H04N 5/378* (2013.01); *H04N 9/045* (2013.01)

(58) Field of Classification Search
CPC .......... H04N 5/23241; H04N 5/23245; H04N 5/3458; H04N 5/3537; H04N 2209/047; H04N 9/045
USPC ............................... 348/272–273, 277, 222.1
See application file for complete search history.

(56) References Cited

U.S. PATENT DOCUMENTS

| | | | |
|---|---|---|---|
| 6,300,612 B1 | 10/2001 | Yu | |
| 6,958,862 B1 * | 10/2005 | Joseph | 359/621 |
| 6,960,757 B2 * | 11/2005 | Merrill et al. | 250/226 |
| 7,227,554 B2 * | 6/2007 | Li | 345/603 |
| 7,411,620 B2 | 8/2008 | Taniguchi et al. | |
| 7,586,528 B2 * | 9/2009 | Fukunaga et al. | 348/274 |
| 7,595,819 B2 | 9/2009 | Kondo | |
| 8,035,708 B2 | 10/2011 | Takizawa et al. | |
| 8,519,319 B2 * | 8/2013 | Toda et al. | 250/208.1 |
| 2004/0178467 A1 * | 9/2004 | Lyon et al. | 257/440 |
| 2006/0023109 A1 | 2/2006 | Mabuchi et al. | |
| 2007/0064129 A1 | 3/2007 | Suzuki | |
| 2009/0167888 A1 | 7/2009 | Noh | |
| 2009/0174811 A1 * | 7/2009 | Sung et al. | 348/396.1 |

(Continued)

FOREIGN PATENT DOCUMENTS

| | | |
|---|---|---|
| KR | 10-0577313 B | 4/2006 |
| KR | 10-0905082 B | 6/2009 |

*Primary Examiner* — Kelly L Jerabek
(74) *Attorney, Agent, or Firm* — Volentine & Whitt, PLLC

(57) ABSTRACT

An image processing device includes a pixel array including multiple unit pixels each configured to generate multiple color signals in response to incident light, and a data processing unit configured to generate output image data by processing the color signals in parallel in a first operating mode, and further configured to generate two image signals for each unit pixel based on the color signals and to generate the output image data by processing the two image signals in parallel in a second operating mode.

16 Claims, 13 Drawing Sheets

(56) References Cited

U.S. PATENT DOCUMENTS

| | | | |
|---|---|---|---|
| 2010/0177246 A1* | 7/2010 | Yong et al. | 348/580 |
| 2010/0295969 A1 | 11/2010 | Cho | |
| 2011/0204461 A1 | 8/2011 | Lee | |
| 2011/0249159 A1 | 10/2011 | Fukunaga | |
| 2012/0205765 A1* | 8/2012 | Hynecek | 257/432 |

* cited by examiner

| G | G | G | G |
|---|---|---|---|
| G | G | G | G |
| G | G | G | G |
| G | G | G | G |

IS2

| R | B | R | B |
|---|---|---|---|
| B | R | B | R |
| R | B | R | B |
| B | R | B | R |

| G | G | G | G |
|---|---|---|---|
| G | G | G | G |
| G | G | G | G |
| G | G | G | G |

IS2

| R | B | R | B |
|---|---|---|---|
| R | B | R | B |
| R | B | R | B |
| R | B | R | B |

IMAGE PROCESSING DEVICE AND SYSTEM OPERABLE IN A HIGH-QUALITY IMAGING MODE AND A POWER SAVING MODE

CROSS-REFERENCE TO RELATED APPLICATION

This application claims priority under 35 USC §119 to Korean Patent Application No. 10-2013-0026036 filed on Mar. 12, 2013, the subject matter of which is hereby incorporated by reference.

BACKGROUND OF THE INVENTION

The inventive concept relates generally to image processing technologies. More particularly, certain embodiments of the inventive concept relate to image processing devices and computing systems comprising the same.

Modern imaging devices, such as cameras, often include both image capture components and image processing components. The image capture components typically capture an image by sensing light on an array of pixels, and the image processing components perform operations on the captured image, such as adjusting captured pixel values for quality purposes or extracting information from the captured pixel values.

High quality imaging devices often include multi-layer image sensors capable of generating multiple color signals from each unit pixel. The use of multi-layer image sensors tends to increase the amount of data produced by an imaging device, which in turn increases the processing load of the image processing components.

Unfortunately, when the processing load of the image processing components is increased, power consumption tends to increase accordingly. As a result, there is a general need for image processing devices and related processing techniques that can perform large amounts of processing without excessive power consumption.

SUMMARY OF THE INVENTION

In one embodiment of the inventive concept, an image processing device comprises a pixel array comprising multiple unit pixels each configured to generate multiple color signals in response to incident light, and a data processing unit configured to generate output image data by processing the color signals in parallel in a first operating mode, and further configured to generate two image signals for each unit pixel based on the color signals and to generate the output image data by processing the two image signals in parallel in a second operating mode.

In another embodiment of the inventive concept, a computing system comprises an image processing device configured to generate output image data corresponding to incident light, a storage device configured to store the output image data, and a processor configured to control the image processing device and the storage device. The image processing device comprises a pixel array comprising multiple unit pixels each configured to generate multiple color signals in response to the incident light, and a data processing unit configured to generate the output image data by processing the color signals in parallel in a first operating mode, and further configured to generate two image signals for each unit pixel based on the color signals and to generate the output image data by processing the two image signals in parallel in a second operating mode.

In yet another embodiment of the inventive concept, an image processing device comprises a pixel array comprising multiple unit pixels each configured to generate "n" color signals in response to incident light, where n is greater than one, and a data processing unit configured to generate output image data by processing the "n" signals in parallel in a first operating mode, and further configured to generate "m" image signals for each unit pixel based on the "n" signals and to generate the output image data by processing the m image signals in parallel in a second operating mode, where m is a positive number less than n.

These and other embodiments of the inventive concept can potentially improve the power efficiency of imaging systems and devices by allowing certain operations to be performed at lower power.

BRIEF DESCRIPTION OF THE DRAWINGS

The drawings illustrate selected embodiments of the inventive concept. In the drawings, like reference numbers indicate like features.

FIG. 9A is a view illustrating an operation of the data processing unit of FIG. 8, according to an embodiment of the inventive concept.

FIG. 9B is a view illustrating an operation of the data processing unit of FIG. 8, according to an embodiment of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, the terms first, second, etc. may be used to describe various features, but these features should not be limited by these terms. Rather, these terms are used merely to distinguish between different features. For example, a first feature could be termed a second feature and vice versa without departing from the scope of the inventive concept. As used herein, the term "and/or" indicates any and all combinations of one or more of the associated listed items.

Where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. Other words used to describe the relationship between features should be interpreted in a similar fashion (e.g., "between" versus "directly between," "adjacent" versus "directly adjacent," etc.).

The terminology used herein is for the purpose of describing particular embodiments and is not intended to limit the inventive concept. As used herein, the singular forms "a," "an" and "the" are intended to include the multiple forms as well, unless the context clearly indicates otherwise. Terms such as "comprises," "comprising," "includes" and/or "including," where used herein, indicate the presence of stated features but do not preclude the presence of other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
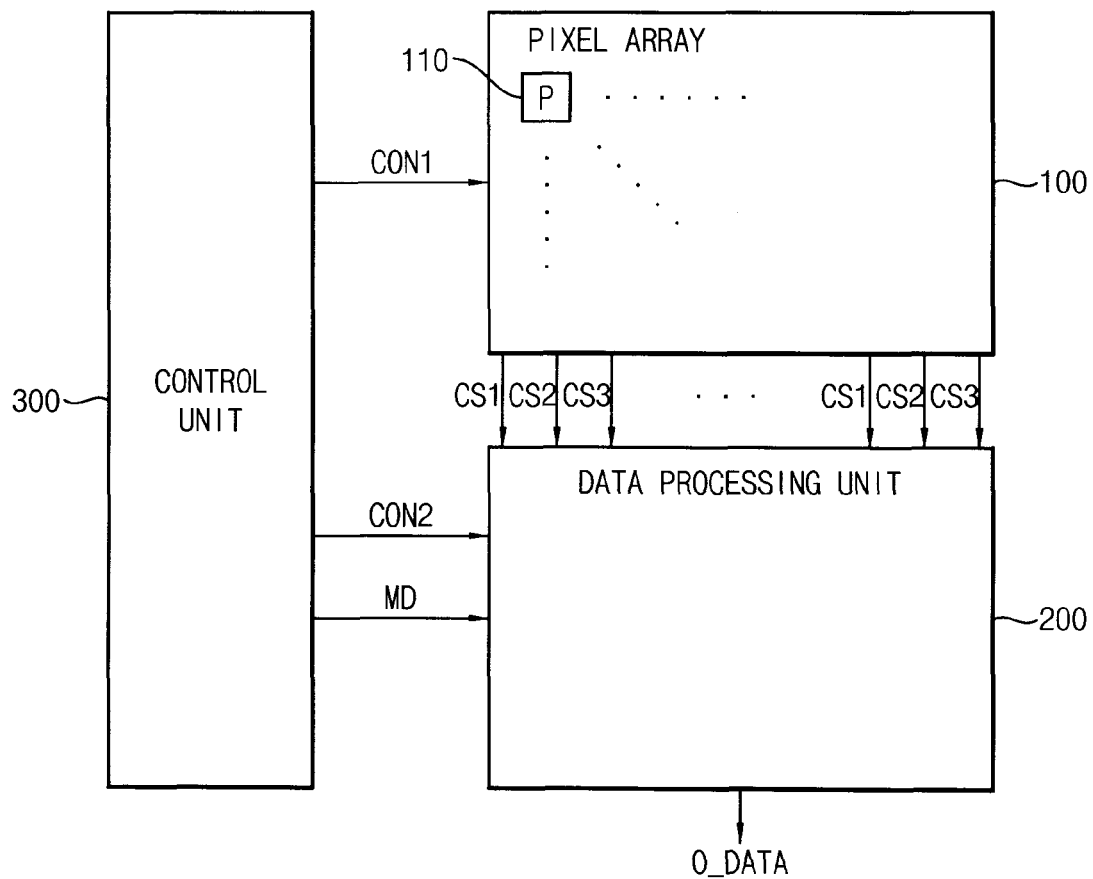
FIG. 1 is a block diagram illustrating an image processing device, according to an embodiment of the inventive concept.

FIG. 1 is a block diagram illustrating an image processing device 10, according to an embodiment of the inventive concept.

Referring to FIG. 1, image processing device 10 comprises a pixel array 100, a data processing unit 200, and a control unit 300. Pixel array 100 comprises multiple unit pixels (P) 110 arranged in rows and columns. Each of unit pixels 110 generates multiple color signals CS1, CS2 and CS3.

Unit pixel 110 typically comprises multiple light receiving devices stacked on each other. The light receiving device may be implemented with either a photo diode or a photo gate. Because transmission factors of optical signals are different from each other according to wavelengths, the receiving devices stacked in unit pixel 110 absorb optical signals having different wavelengths to generate color signals CS1, CS2 and CS3 having different colors.

In some embodiments, unit pixel 110 in pixel array 100 comprises organic materials reacting to an optical signal of a specific wavelength. Thus, in response to optical signals having different wavelength, the organic materials in unit pixel 110 may generate color signals CS1, CS2 and CS3 corresponding to different colors.

Control unit 300 controls operations of the pixel array in units of row through a first control signal CON1. Thus, unit pixels 110, which are in the same row of pixel array 100, simultaneously generate color signals CS1, CS2 and CS3, respectively and provide color signals CS1, CS2 and CS3 to data processing unit 200.

Control unit 300 controls operations of data processing unit 200 through a control signal CON2 and a mode signal MD. In some embodiments, control unit 300 generates mode signal MD based on a selection by a user.

Data processing unit 200 serializes color signals CS1, CS2 and CS3 provided in units of rows from pixel array 100 based on second control signal CON2, and generates output image data O_DATA based on color signals CS1, CS2 and CS3 generated from unit pixel 110.

Data processing unit 200 operates in a first operating mode or a second operating mode based on mode signal MD. For example, where mode signal MD has a first logic level, data processing unit 200 operates in the first operating mode. Where mode signal MD has a second logic level, data processing unit 200 operates in the second operating mode.

Data processing unit 200 processes color signals CS1, CS2 and CS3 in parallel in the first operating mode to generate output image data O_DATA. Data processing unit 200 generates two image signals every unit pixels 110 based on color signals CS1, CS2 and CS3 in the second operating mode and then, processes the two image signals in parallel to generate output image data O_DATA.

In the first operating mode, because data processing unit 200 uses all of color signals CS1, CS2 and CS3 provided from each unit pixel 110 to perform a data processing so that output image data O_DATA is generated, data processing unit 200 may provide a high-quality image. Thus, the first operating mode may be a high-quality imaging mode.

In the second operating mode, data processing unit 200 generates two image signals based on color signals CS1, CS2 and CS3 provided from each unit pixel 110 so that an amount of data is reduced. Then, data processing unit 200 performs a data processing using the two image signals to generate output image data O_DATA, so that a consumed electric power may be reduced. Thus, the second operating mode may be a power saving mode.

In some embodiments, data processing unit 200 converts color signals CS1, CS2 and CS3, which are provided from each unit pixel 110, into two image signals in YUV format in the second operating mode. For example, each of unit pixels 110 generates green, red and blue signals GS, RS and BS corresponding to green, red and blue colors of light incident thereupon. In the second operating mode, data processing unit 200 converts the green, red and blue signals GS, RS and BS into signal in YUV format, such that data processing unit 200 generates a first image signal IS1 corresponding to a Y component (i.e., luminance component) and a second image signal IS2 corresponding to one of an U component (i.e., a first chrominance component) and a V component (i.e., a second chrominance component). Then, data processing unit 200 processes first and second image signals IS1 and IS2 in parallel to generate output image data O_DATA. In this case, data processing unit 200 generates second image signal IS2 by alternately selecting the U and V components for each of unit pixels 110 arrayed in pixel array 100 in a matrix form. Thus, data processing unit 200 may generates first and second image signals IS1 and IS2 in YUV422 format in the second operating mode.

Various examples of data processing unit 200 are described below with reference to FIGS. 2 to 7.

Figure 2:
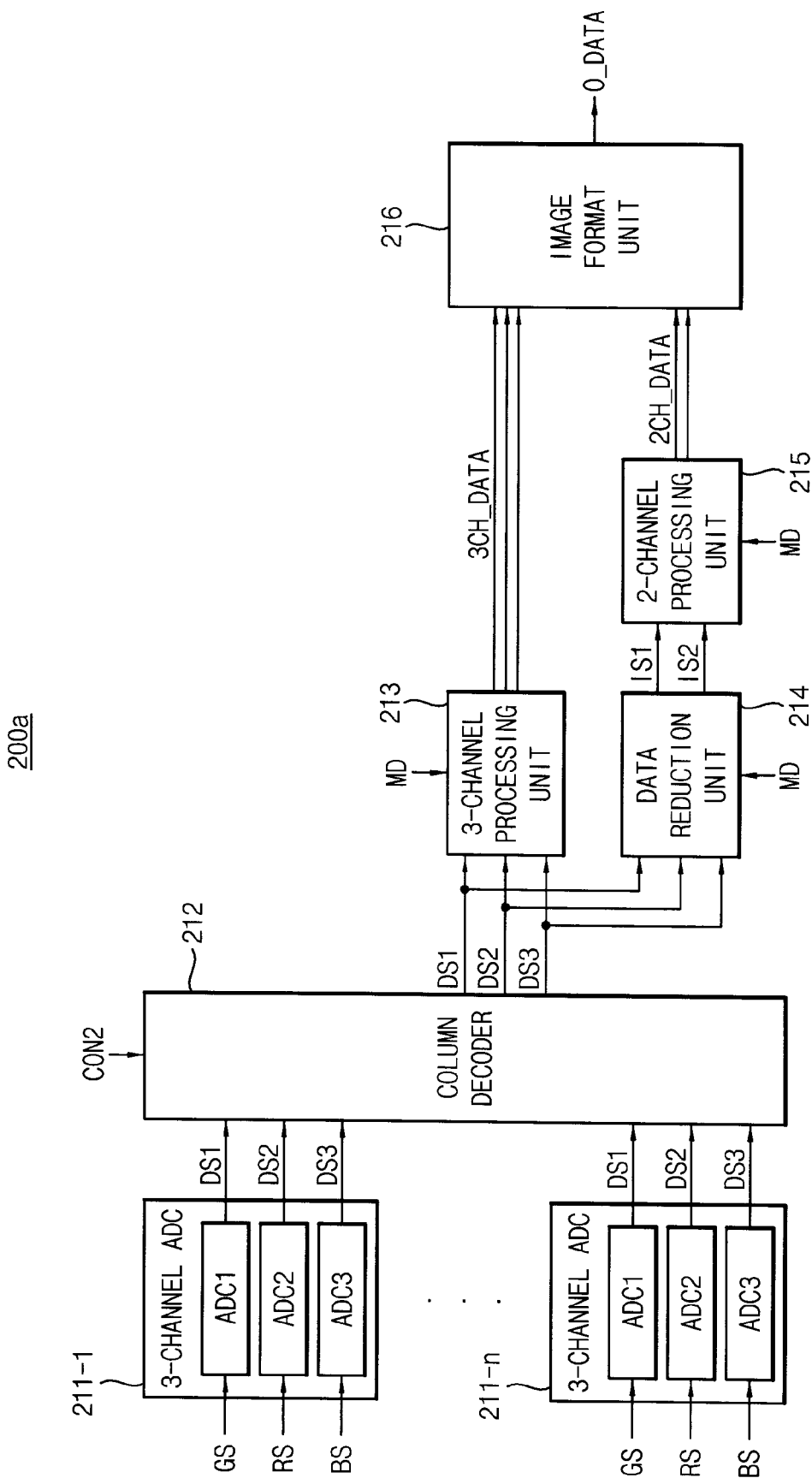
FIG. 2 is a block diagram illustrating a data processing unit in the image processing device of FIG. 1, according to an embodiment of the inventive concept.

FIG. 2 is a block diagram illustrating one example of the data processing unit 200 in image processing device 10 of FIG. 1.

Referring to FIG. 2, data processing unit 200a comprises multiple 3-channel analog-digital conversion units 211-1, ... and 211-n, a column decoder 212, a 3-channel processing unit 213, a data reduction unit 214, a 2-channel processing unit 215, and an image format unit 216, where n is a greater than one.

The 3-channel analog-digital conversion units 211-1, . . . and 211-n are connected to the columns of pixel array 100, respectively, to receive the green, red and blue signals GS, RS and BS. Each of the 3-channel analog-digital conversion units 211-1 and 211-n comprises first to third analog-digital converters ADC1, ADC2 and ADC3. First to third analog-digital converters ADC1, ADC2 and ADC3 perform an analog-to-digital conversion in parallel to convert the green, red and blue signals GS, RS and BS into first to third digital signals DS1, DS2 and DS3.

Column decoder 212 sequentially outputs first to third digital signals DS1, DS2 and DS3 received from the 3-channel analog-digital conversion units 211-1, and 211-n based on second control signal CON2 provided from control unit 300.

In the first operating mode where mode signal MD has the first logic level, 3-channel processing unit 213 performs the 3-channel data processing for first to third digital signals DS1, DS2 and DS3, so that 3-channel processing unit 213 may generate 3-channel data 3CH_DATA comprising three processing signals. The 3-channel data processing signifies the generation of three output signals by performing a data processing for three input signals independently from each other and/or dependently on each other. For example, 3-channel processing unit 213 may perform a noise removing operation, a sharpening operation and a gamma correction for first to third digital signals DS1, DS2 and DS3.

Meanwhile, 3-channel processing unit 213 may be turned off in the second operating mode where mode signal MD has the second logic level.

Data reduction unit 214 converts the format of first to third digital signals DS1, DS2 and DS3 into the YUV format to generate the Y signal corresponding to the Y component as first image signal IS1 and generate one of the U and V signals corresponding to the U and V components as the second image signals IS2 in the second operating mode in which mode signal MD has the second logic level. For example, data reduction unit 214 may generate second image signal IS2 by alternately selecting the U and V signals whenever data reduction unit 214 receives first to third digital signals DS1, DS2 and DS3 from column decoder 212. Thus, first and second image signals IS1 and IS2 generated by data reduction unit 214 in the second operating mode may have the YUV422 format. In some embodiments, first to third digital signals DS1, DS2 and DS3 and first and second image signals IS1 and IS2 are 8-bit signals. Therefore, data reduction unit 214 may reduce the amount of data from 24-bit data to 16-bit data. Meanwhile, data reduction unit 214 may be turned off in the first operating mode in which mode signal MD has the first logic level.

Figure 3:
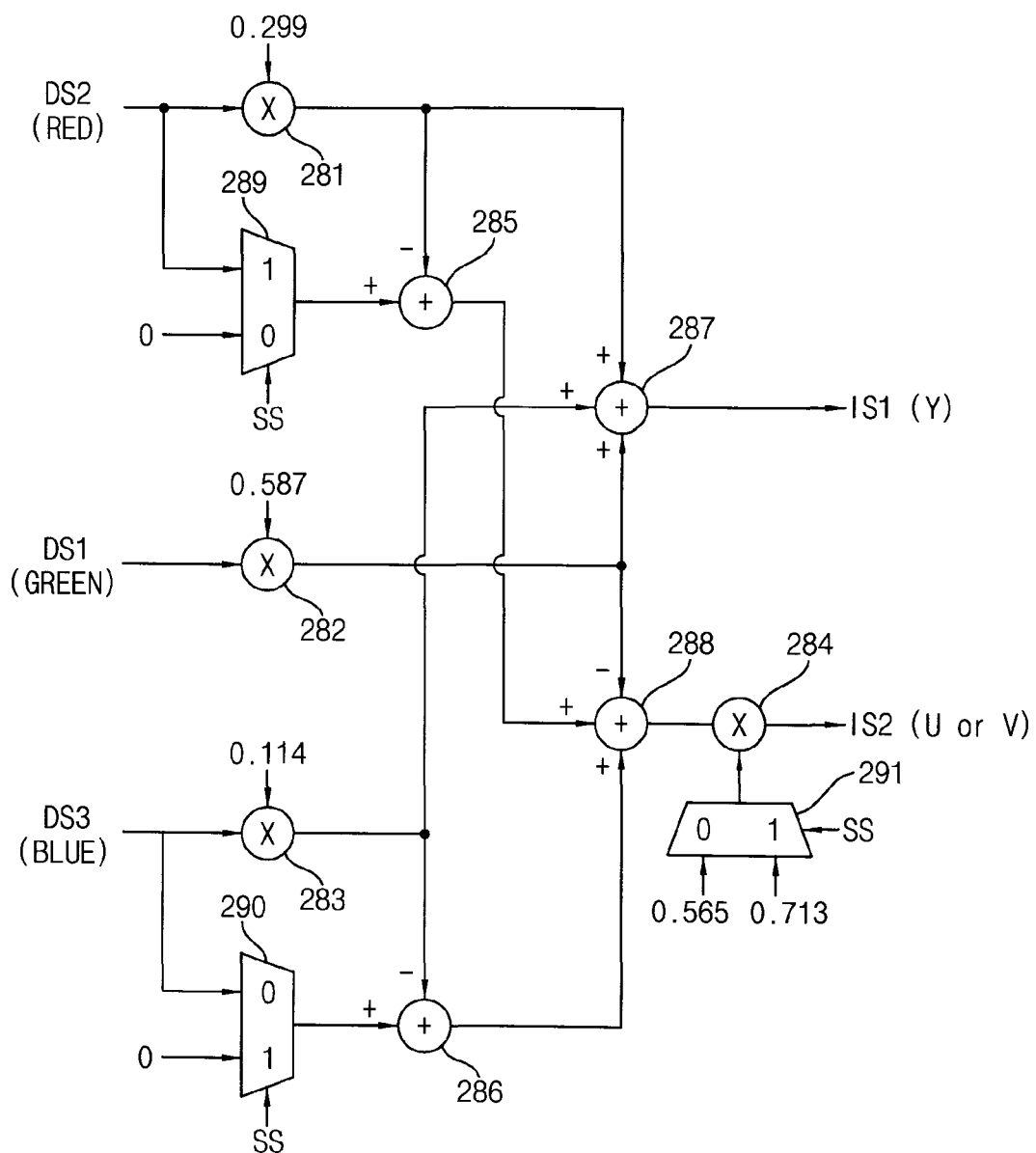
FIG. 3 is a block diagram illustrating a data reduction unit in the data processing unit of FIG. 2, according to an embodiment of the inventive concept.

FIG. 3 is a block diagram illustrating an example of data reduction unit 214 in the data processing unit 200a of FIG. 2.

Referring to FIG. 3, data reduction unit 214a comprises first to fourth multipliers 281 to 284, first to fourth adders 285 to 288 and first to third multiplexers 289 to 291. Red, green and blue signals R, G and B (i.e., RGB signals) can be converted into Y, U and V signals Y, U and V (i.e., YUV signals) according to the following set of Equations (1)-(3).

$$Y = 0.299R + 0.587G + 0.114B \quad (1)$$

$$U = (B-Y)*0.565 = (-0.299R - 0.587G + 0.886B)*0.565 \quad (2)$$

$$V = (R-Y)*0.713 = (0.701R - 0.587G - 0.114B)*0.713 \quad (3)$$

Because first to third digital signals DS1, DS2 and DS3 provided from column decoder 212 correspond to the green, red and blue signals G, R and B, respectively, data reduction unit 214a may convert first to third digital signals DS1, DS2 and DS3 into Y, U and V signals in YUV format through Equations (1)-(3) to output the Y signal as first image signal IS1 and may output one signal selected from the U and V signals based on selection signal SS as second image signal IS2.

Where selection signal SS has a logic low level, first multiplexer 289 may output '0' (zero), second multiplexer 290 may output the third digital signal DS3, and third multiplexer 291 may output 0.565. Where selection signal SS has a logic high level, first multiplexer 289 outputs second digital signal DS2, second multiplexer 290 outputs '0', and third multiplexer 291 outputs 0.713. Thus, where selection signal SS has a logic low level, data reduction unit 214a outputs the Y signal as first image signal IS1 and the U signal as second image signal IS2. Where selection signal SS has a logic high level, data reduction unit 214a outputs the Y signal as first image signal IS1 and the V signal as second image signal IS2. The logic level of selection signal SS may be switched whenever data reduction unit 214a receives first to third digital signals DS1, DS2 and DS3 from column decoder 212. In some embodiments, selection signal SS may be provided from control unit 330. In some other embodiments, selection signal SS is generated from inside data reduction unit 214a.

Meanwhile, first to fourth multipliers 281 to 284, first to fourth adders 285 to 288 and first to third multiplexers 289, 290 and 291 may be turned off in the first operating mode in which mode signal MD has the first logic level.

Referring again to FIG. 2, in the second operating mode in which mode signal MD has the second logic level, 2-channel processing unit 215 performs the 2-channel data processing for first and second image signals IS1 and IS2 to generate 2-channel data 2CH_DATA comprising two processing signals. The 2-channel data processing is the generation of two output signals by performing a data processing for two input signals independently from each other and/or dependently on each other. For example, 2-channel processing unit 215 may perform a sharpening operation and a color correcting operation for first and second image signals IS1 and IS2 in YUV422 format.

Meanwhile, 2-channel processing unit 215 may be turned off in the first operating mode where mode signal MD has the first logic level.

Image format unit 216 generates output image data O_DATA by converting format of the 3-channel data 3CH_DATA from 3-channel processing unit 213 or the 2-channel data 2CH_DATA from 2-channel processing unit 215 into a format corresponding to a standard protocol. For example, image format unit 216 may generate output image data O_DATA by converting the format of either the 3-channel data 3CH_DATA or the 2-channel data 2CH_DATA into a format corresponding to Joint Photographic Expert Group (JPEG) standard protocol. In some embodiments, image format unit 216 generates multiple output image data O_DATA by converting the format of the 3-channel data 3CH_DATA or the 2-channel data 2CH_DATA into formats corresponding to multiple standard protocols.

Data processing unit 200a may be integrated on one chip together with pixel array 100. 3-channel processing unit 213, data reduction unit 214, 2-channel processing unit 215 and image format unit 216 in data processing unit 200a may be integrated on separated chips to form an image signal processor (ISP).

As described above, in a first operating mode, image processing device 10 comprising data processing unit 200a of FIG. 2 performs 3-channel data processing for green, red and blue signals GS, RS and BS generated from each unit pixel 110 of pixel array 100 to generate output image data O_DATA so that image processing device 10 may provide an high-quality image. In addition, in a second operating mode, image processing device 10 does not perform the 3-channel data processing for the green, red and blue signals GS, RS and BS generated from each unit pixel of pixel array 100, but converts the green, red and blue signals GS, RS and BS into first and second image signals IS1 and IS2 in YUV422 format to reduce the amount of data, and then, performs the 2-channel data processing for first and second image signals IS1 and IS2 to generate output image data O_DATA, so that the power consumption can be reduced.

Figure 4:
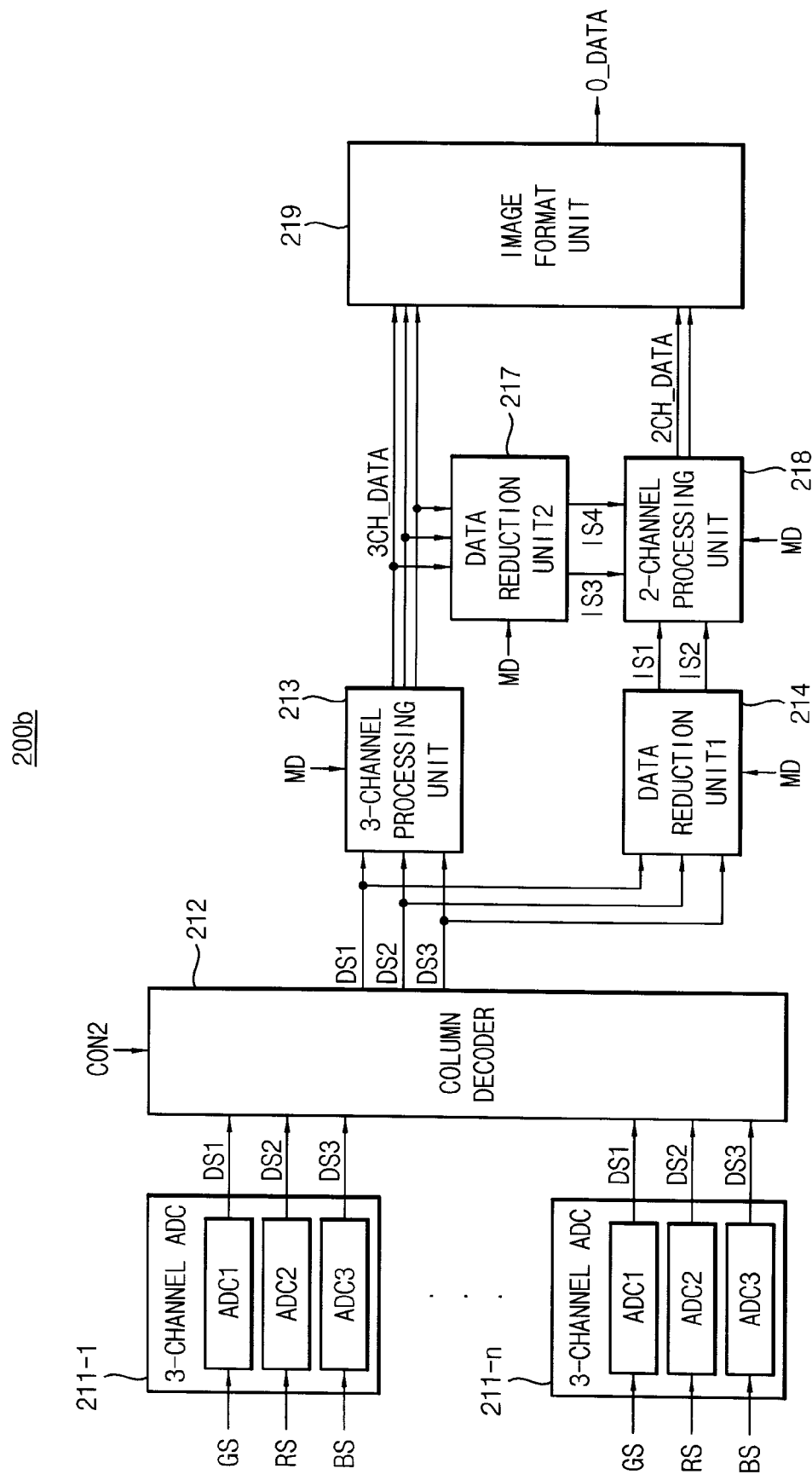
FIG. 4 is a block diagram illustrating a data processing unit in the image processing device of FIG. 1, according to another embodiment of the inventive concept.

FIG. 4 is a block diagram illustrating another example of data processing unit 200 in image processing device 10 of FIG. 1.

Referring to FIG. 4, data processing unit 200b comprises multiple 3-channel analog-digital conversion units 211-1, ... and 211-n, a column decoder 212, a 3-channel processing unit 213, a first data reduction unit 214, a second data reduction unit 217, a 2-channel processing unit 218, and an image format unit 219, where n is greater than one. 3-channel analog-digital conversion units 211-1, ... and 211-n, column decoder 212, 3-channel processing unit 213 and the first data reduction unit 214 in data processing unit 200b of FIG. 4 are the same as those of data processing unit 200a of FIG. 2, so duplicated descriptions will be omitted.

Second data reduction unit 217 converts the format of the 3-channel data 3CH_DATA into YUV format to generate a Y signal corresponding to the Y component as a third image signal IS3 and generate one of U and V signals corresponding to the U and V components as the fourth image signals IS4 in the first operating mode in which mode signal MD has the first logic level. For example, second data reduction unit 217 may generate the fourth image signal IS4 by alternately selecting the U and V signals whenever second data reduction unit 217 receives the 3-channel data 3CH_DATA from 3-channel processing unit 213.

Meanwhile, second data reduction unit 217 may be turned off in the second operating mode in which mode signal MD has the second logic level.

Second data reduction unit 217 may be implemented with data reduction unit 214a of FIG. 3. Because the configuration and operation of data reduction unit 214a of FIG. 3 have been described with reference to FIGS. 2 and 3, the detailed description about second data reduction unit 217 will be omitted.

In the first operating mode in which mode signal MD has the first logic level, 2-channel processing unit 218 performs the 2-channel data processing for the third and fourth image signals IS3 and IS4 provided from second data reduction unit 217 to generate 2-channel data 2CH_DATA comprising two processing signals. In the second operating mode in which mode signal MD has the second logic level, the 2-channel processing unit 218 performs the 2-channel data processing for first and second image signals IS1 and IS2 provided from the first data reduction unit 214 to generate the 2-channel data 2CH_DATA comprising two processing signals. The 2-channel data processing signifies the generation of two output signals by performing a data processing for two input signals independently from each other and/or dependently on each other. For example, the 2-channel processing unit 218 perform a sharpening operation and a color correcting operation for first and second image signals IS1 and IS2 or third and fourth image signals IS3 and IS4 in YUV422 format.

Image format unit 219 generates output image data O_DATA by converting the format of 3-channel data 3CH_DATA from 3-channel processing unit 213 and/or 2-channel data 2CH_DATA from the 2-channel processing unit 218 into a format corresponding to a standard protocol. For example, image format unit 219 may generate output image data O_DATA by converting the format of the 3-channel data 3CH_DATA and/or the 2-channel data 2CH_DATA into a format corresponding to JPEG standard protocol. In an embodiment, image format unit 219 generates multiple output image data O_DATA by converting the format of the 3-channel data 3CH_DATA and/or the 2-channel data 2CH_DATA into formats corresponding to multiple standard protocols.

Data processing unit 200b may be integrated on one chip together with pixel array 100. 3-channel processing unit 213, the first and second data reduction unit 214 and 217, the 2-channel processing unit 218 and image format unit 219 in data processing unit 200b may be integrated on separated chips to form an ISP.

As described above, in a first operating mode, image processing device 10 comprising data processing unit 200b of FIG. 4 performs the 3-channel data processing for green, red and blue signals GS, RS and BS generated from each unit pixel 110 of pixel array 100 to reduce an amount of data. Then, image processing device 10 additionally performs the 2-channel data processing to generate output image data O_DATA, so that image processing device 10 may provide a high-quality image. In addition, in a second operating mode, after reducing the amount of data by converting the green, red and blue signals GS, RS and BS generated from each unit pixel 110 of pixel array 100, image processing device 10 may perform the 2-channel data processing for first and second image signals IS1 and IS2 to generate output image data O_DATA, so that the power consumption can be reduced.

Figure 5:
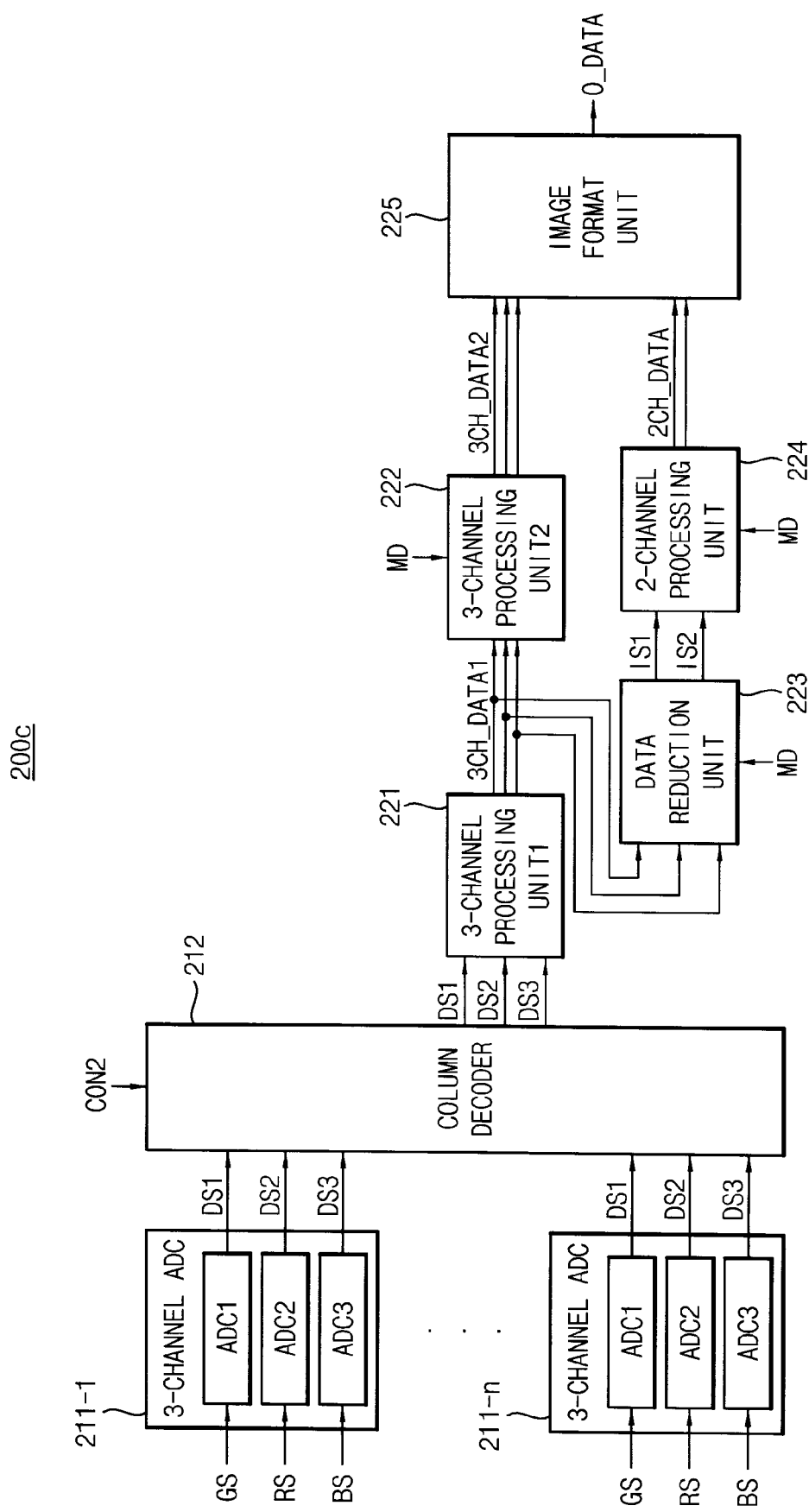
FIG. 5 is a block diagram illustrating a data processing unit in the image processing device of FIG. 1, according to another embodiment of the inventive concept.

FIG. 5 is a block diagram illustrating still another example of data processing unit 200 in image processing device 10 of FIG. 1.

Referring to FIG. 5, data processing unit 200c comprises multiple 3-channel analog-digital conversion units 211-1, ... and 211-n, a column decoder 212, a first 3-channel processing unit 221, a second 3-channel processing unit 222, a data reduction unit 223, a 2-channel processing unit 224, and an image format unit 225, where n is greater than one.

3-channel analog-digital conversion units 211-1, ... and 211-n and column decoder 212 in data processing unit 200c of FIG. 5 are the same as those of data processing unit 200a of FIG. 2, so duplicated descriptions will be omitted.

Comparing data processing unit 200c of FIG. 5 with data processing unit 200a of FIG. 2, in the second operating mode, without performing the 3-channel data processing for the green, red and blue signals GS, RS and BS, data processing unit 200a of FIG. 2 reduces the amount of data by converting the green, red and blue signals GS, RS and BS into first and second image signals IS1 and IS2 in YUV422 format and then, only performs the 2-channel data processing for first and second image signals IS1 and IS2 to generate output image data O_DATA. To the contrary, as described below, in the second operating mode, data processing unit 200c of FIG. 5 may partially perform the 3-channel data processing for the green, red and blue signals GS, RS and BS to reduce the amount of data and then, may perform the 2-channel data processing to generate output image data O_DATA.

Regardless of the operating mode, first 3-channel processing unit 221 may perform the 3-channel data processing for first to third digital signals DS1, DS2 and DS3 to generate first 3-channel data 3CH_DATA1 comprising three processing signals. first 3-channel processing unit 221 may partially perform the 3-channel data processing performed by 3-channel processing unit 213 in data processing unit 200a of FIG. 2. For example, first 3-channel processing unit 221 may perform a noise removing operation for first to third digital signals DS1, DS2 and DS3 to generate first 3-channel data 3CH_DATA1.

In the first operating mode where mode signal MD has the first logic level, second 3-channel processing unit 222 may perform the 3-channel data processing for first 3-channel data 3CH_DATA, so that first 3-channel processing unit 222 may generate second 3-channel data 3CH_DATA2 comprising three processing signals. second 3-channel processing unit 222 may perform the 3-channel data processing performed by 3-channel processing unit 213 in data processing unit 200a of FIG. 2 except for a portion of the 3-channel data processing performed by first 3-channel processing unit 221. For example, second 3-channel processing unit 222 may perform the sharpening operation and the gamma correction for first 3-channel data 3CH_DATA1 to generate second 3-channel data 3CH_DATA2. Meanwhile, second 3-channel processing unit 222 may be turned off in the second operating mode where mode signal MD has the second logic level.

In the second operating mode in which mode signal MD has the second logic level, data reduction unit 223 converts the format of first 3-channel data 3CH_DATA1 into the YUV format to generate the Y signal corresponding to the Y component as first image signal IS1 and generate one of the U and V signals corresponding to the U and V components as the second image signals IS2. For example, data reduction unit 223 may generate second image signal IS2 by alternately selecting the U and V signals whenever data reduction unit 223 receives first 3-channel data 3CH_DATA1 from first 3-channel processing unit 221. Thus, first and second image signals IS1 and IS2 generated by data reduction unit 223 in the second operating mode may have the YUV422 format. Meanwhile, data reduction unit 223 may be turned off in the first operating mode in which mode signal MD has the first logic level.

Data reduction unit 223 may be implemented with data reduction unit 214a of FIG. 3. Because the configuration and operation of data reduction unit 214a of FIG. 3 have been described with reference to FIGS. 2 and 3, further description of data reduction unit 223 will be omitted.

In the second operating mode in which mode signal MD has the second logic level, the 2-channel processing unit 224 performs the 2-channel data processing for first and second image signals IS1 and IS2 to generate the 2-channel data 2CH_DATA comprising two processing signals. The 2-channel data processing signifies the generation of two output signals by performing the data processing for two input signals independently form each other and/or dependently on each other. For example, the 2-channel processing unit 224 may perform a sharpening operation and a color correcting operation for first and second image signals IS1 and IS2 in YUV422 format. Meanwhile, the second data reduction unit 224 may be turned off in the first operating mode in which mode signal MD has the first logic level.

Image format unit 225 generates output image data O_DATA by converting the format of second 3-channel data 3CH_DATA2 received from second 3-channel processing unit 222 or the 2-channel data 2CH_DATA received from the 2-channel processing unit 224 into a format corresponding to a standard protocol. For example, image format unit 225 may generate output image data O_DATA by converting the format of second 3-channel data 3CH_DATA2 or the 2-channel data 2CH_DATA into a format corresponding to JPEG standard protocol. In some embodiments, image format unit 225 generates multiple output image data O_DATA by converting the format of second 3-channel data 3CH_DATA2 or the 2-channel data 2CH_DATA into formats corresponding to multiple standard protocols.

Data processing unit 200c may be integrated on one chip together with pixel array 100. First and second 3-channel processing units 221 and 222, data reduction unit 223, 2-channel processing unit 224 and image format unit 225 in data processing unit 200c may be integrated on separated chips to form an ISP.

As described above, in a first operating mode, image processing device 10 comprising data processing unit 200c of FIG. 5 performs the 3-channel data processing for green, red and blue signals GS, RS and BS generated from each unit pixel 110 of pixel array 100 to generate output image data O_DATA, so that image processing device 10 may provide an high-quality image. In addition, in the second operating mode if output image data O_DATA are generated through the 2-channel data processing after the 3-channel data processing for the green, red and blue signals GS, RS and BS generated from each unit pixel 110 of pixel array 100 is partially performed to reduce the amount of data, the power consumption may be slightly increased as compared with that of the second operating mode of image processing device 10 comprising data processing unit 200a of FIG. 2, but the high-quality image can be provided.

Figure 6:
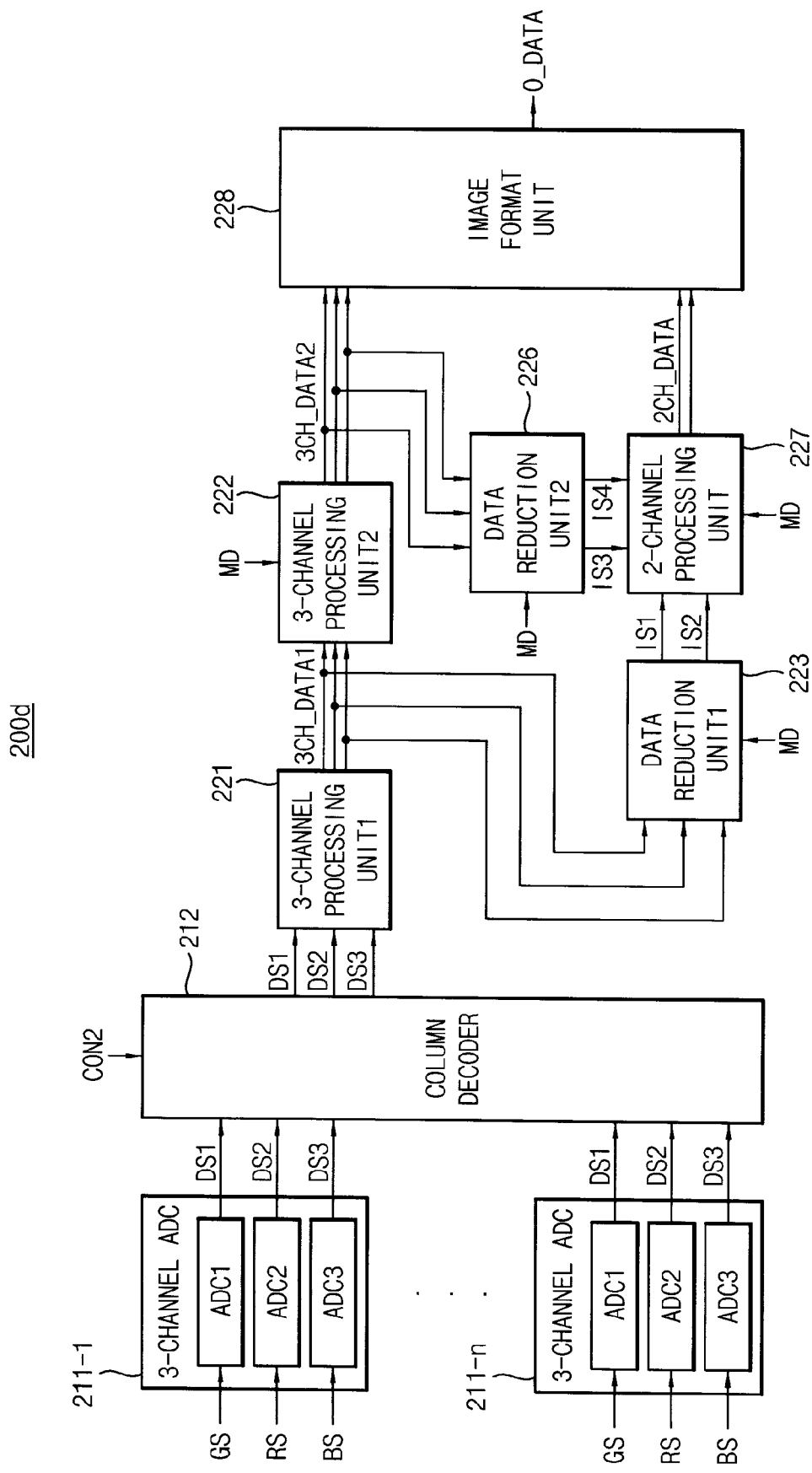
FIG. 6 is a block diagram illustrating a data processing unit in the image processing device of FIG. 1, according to another embodiment of the inventive concept.

FIG. 6 is a block diagram illustrating still another example of data processing unit 200 in image processing device 10 of FIG. 1.

Referring to FIG. 6, data processing unit 200d comprises multiple 3-channel analog-digital conversion units 211-1, . . . , 211-n, a column decoder 212, first and second 3-channel processing units 221 and 222, first and second data reduction units 223 and 226, a 2-channel processing unit 227, and an image format unit 228, where n is greater than one. 3-channel analog-digital conversion units 211-1, . . . and 211-n, column decoder 212, first and second 3-channel processing units 221 and 222, and the first data reduction unit 223 in data processing unit 200d of FIG. 6 are the same as those of data processing unit 200c of FIG. 5, so duplicated descriptions will be omitted.

Second data reduction unit 226 may convert the format of second 3-channel data 3CH_DATA2 provided from second 3-channel processing unit 222 into YUV format to generate a Y signal corresponding to the Y component as a third image signal IS3 and generate one of U and V signals corresponding to the U and V components as the fourth image signals IS4 in the first operating mode in which mode signal MD has the first logic level. For example, the second data reduction unit 226 may generate the fourth image signal IS4_by alternately selecting the U and V signals whenever the second data reduction unit 226 receives second 3-channel data 3CH_DATA2 from second 3-channel processing unit 222. Meanwhile, the second data reduction unit 226 may be turned off in the second operating mode in which mode signal MD has the second logic level.

Second data reduction unit 226 may be implemented with data reduction unit 214a of FIG. 3. The configuration and operation of data reduction unit 214a of FIG. 3 have been described with reference to FIGS. 2 and 3, so further description of second data reduction unit 226 will be omitted.

In the first operating mode in which mode signal MD has the first logic level, 2-channel processing unit 227 performs the 2-channel data processing for third and fourth image signals IS3 and IS4 provided from second data reduction unit 226 to generate 2-channel data 2CH_DATA comprising two processing signals. In the second operating mode in which mode signal MD has the second logic level, 2-channel processing unit 227 performs the 2-channel data processing for first and second image signals IS1 and IS2 provided from first data reduction unit 223 to generate the 2-channel data 2CH_DATA comprising two processing signals. The 2-channel data processing signifies the generation of two output signals by performing a data processing for two input signals independently from each other and/or dependently on each other. For example, the 2-channel processing unit 227 may perform a sharpening operation and a color correcting operation for first and second image signals IS1 and IS2 or the third and fourth image signals IS3 and IS4 in YUV422 format.

Image format unit 228 generates output image data O_DATA by converting the format of second 3-channel data 3CH_DATA2 from second 3-channel processing unit 222 and/or 2-channel data 2CH_DATA from the 2-channel processing unit 227 into a format corresponding to a standard protocol. For example, image format unit 228 may generate output image data O_DATA by converting the format of second 3-channel data 3CH_DATA2 and/or the 2-channel data 2CH_DATA into a format corresponding to JPEG standard protocol. In some embodiments, image format unit 228 generates multiple output image data O_DATA by converting the format of second 3-channel data 3CH_DATA2 and/or 2-channel data 2CH_DATA into formats corresponding to multiple standard protocols.

Data processing unit 200d may be integrated on one chip together with pixel array 100. First and second 3-channel processing units 221 and 222, the first and second data reduction unit 223 and 226, the 2-channel processing unit 227 and image format unit 228 in data processing unit 200d may be integrated on separated chips to form an ISP.

As described above, in a first operating mode, image processing device 10 comprising data processing units 200d of FIG. 6 performs the 3-channel data processing for green, red and blue signals GS, RS and BS generated from each unit pixel 110 of pixel array 100 to reduce an amount of data. Then, image processing device 10 additionally performs the 2-channel data processing to generate output image data O_DATA, so that image processing device 10 may provide a high-quality image. In addition, in the second operating mode, if output image data O_DATA are generated through the 2-channel data processing after the 3-channel data processing for the green, red and blue signals GS, RS and BS generated from each unit pixel 110 of pixel array 100 is partially performed to reduce the amount of data, the power consumption may be slightly increased as compared with that of the second operating mode of image processing device 10 comprising data processing unit 200a of FIG. 2, but the high-quality image can be provided.

Figure 7:
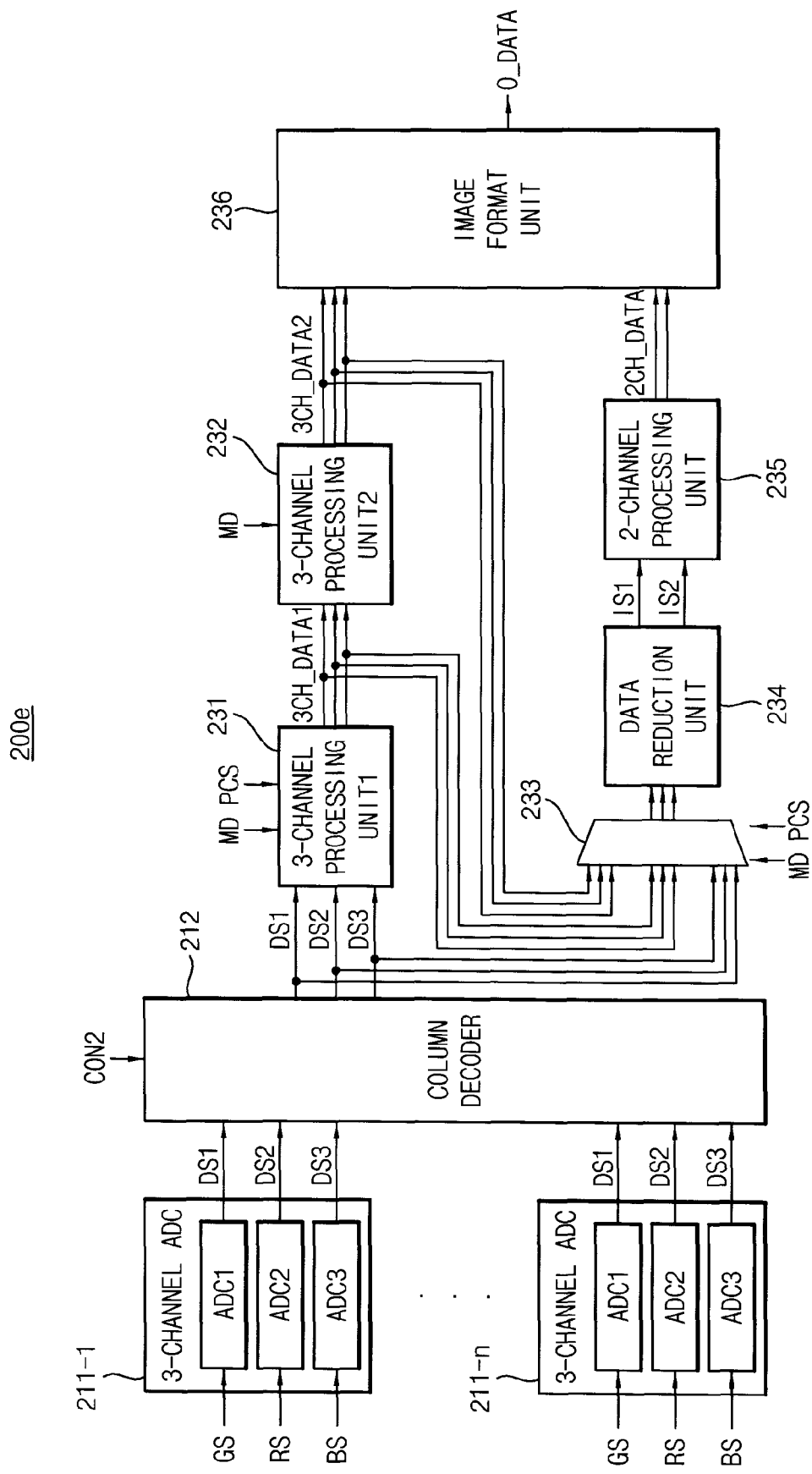
FIG. 7 is a block diagram illustrating a data processing unit in the image processing device of FIG. 1, according to another embodiment of the inventive concept.

FIG. 7 is a block diagram illustrating still another example of data processing unit 200 in image processing device 10 of FIG. 1.

Referring to FIG. 7, data processing unit 200e comprises multiple 3-channel analog-digital conversion units 211-1, ... and 211-n, a column decoder 212, first and second 3-channel processing units 231 and 232, a multiplexer 233, a data reduction unit 234, a 2-channel processing unit 235, and an image format unit 236, where n is greater than one.

In the first operating mode where mode signal MD has the first logic level and the second operating mode where mode signal MD has the second logic level, first 3-channel processing unit 231 may be turned on where power control signal PCS has the first logic level, and may perform the 3-channel data processing for first to third digital signals DS1, DS2 and DS3 to generate first 3-channel data 3CH_DATA1 comprising three processing signals. First 3-channel processing unit 231 may partially perform the 3-channel data processing performed by 3-channel processing unit 213 in data processing unit 200a of FIG. 2. For example, first 3-channel processing unit 231 may perform a noise removing operation for first to third digital signals DS1, DS2 and DS3 to generate first 3-channel data 3CH_DATA1. Power control signal PCS may be provided from control unit 300.

Meanwhile, first 3-channel processing unit 231 may be turned off where power control signal PCS has the second logic level in the second operating mode where mode signal MD has the second logic level.

In the first operating mode where mode signal MD has the first logic level, second 3-channel processing unit 232 performs the 3-channel data processing for first 3-channel data, so that first 3-channel processing unit 232 generates second 3-channel data 3CH_DATA2 comprising three processing signals. Second 3-channel processing unit 232 performs the 3-channel data processing performed by 3-channel processing unit 213 in data processing unit 200a of FIG. 2 except for a portion of the 3-channel data processing performed by first 3-channel processing unit 231. For example, second 3-channel processing unit 232 may perform the sharpening operation and the gamma correction for first 3-channel data 3CH_DATA1 to generate second 3-channel data 3CH_DATA2.

Meanwhile, second 3-channel processing unit 232 may be turned off in the second operating mode where mode signal MD has the second logic level.

Multiplexer 233 outputs second 3-channel data 3CH_DATA2 in the first operating mode where mode signal MD has the first logic level. Multiplexer 233 outputs first 3-channel data 3CH_DATA1 where power control signal PCS has the first logic level in the second operating mode where mode signal MD has the second logic level. Multiplexer 233 outputs first to third digital signals DS1, DS2 and DS3 where power control signal PCS has the second logic level in the second operating mode where mode signal MD has the second logic level.

Regardless of the operating mode, data reduction unit 234 may convert the format of the digital provided from multiplexer 233 into the YUV format to generate the Y signal corresponding to the Y component as first image signal IS1 and to generate one of the U and V signals corresponding to the U and V components as the second image signals IS2. For example, data reduction unit 234 may generate second image signal IS2 by alternately selecting the U and V signals whenever data reduction unit 234 receives data from multiplexer 233. Thus, first and second image signals IS1 and IS2 generated by data reduction unit 234 may have the YUV422 format.

Data reduction unit 234 may be implemented with data reduction unit 214a of FIG. 3. Because the configuration and operation of data reduction unit 214a of FIG. 3 have been described with reference to FIGS. 2 and 3, further description of data reduction unit 234 will be omitted.

Regardless of the operating mode, the 2-channel processing unit 235 may perform the 2-channel data processing for first and second image signals IS1 and IS2 to generate the 2-channel data 2CH_DATA comprising two processing signals. The 2-channel data processing signifies the generation of two output signals by performing the data processing for two input signals independently from each other and/or dependently on each other. For example, the 2-channel processing unit 235 may perform a sharpening operation and a color correcting operation for first and second image signals IS1 and IS2 in YUV422 format.

Image format unit 236 generates output image data O_DATA by converting the format of second 3-channel data 3CH_DATA2 received from second 3-channel processing unit 232 or the 2-channel data 2CH_DATA received from the 2-channel processing unit 235 into a format corresponding to a standard protocol. For example, image format unit 236 may generate output image data O_DATA by converting the format of second 3-channel data 3CH_DATA2 or the 2-channel data 2CH_DATA into a format corresponding to JPEG standard protocol. In some embodiments, image format unit 236 generates multiple output image data O_DATA by converting the format of second 3-channel data 3CH_DATA2 or the 2-channel data 2CH_DATA into formats corresponding to multiple standard protocols.

Data processing unit 200e may be integrated on one chip together with pixel array 100. first and second 3-channel processing units 231 and 232, multiplexer 233, data reduction unit 234, the 2-channel processing unit 235 and image format unit 236 in data processing unit 200e may be integrated on separated chips to form an ISP.

As described above, in a first operating mode, image processing device 10 comprising data processing unit 200e of FIG. 7 performs the 3-channel data processing for green, red and blue signals GS, RS and BS generated from each unit pixel 110 of pixel array 100 to generate output image data O_DATA, so that image processing device 10 may provide an high-quality image. In addition, in the second operating mode, after performing the 3-channel data processing for the green, red and blue signals GS, RS and BS generated from each unit pixel 110 of pixel array 100 based on power control signal PCS, image processing device 10 may reduce the amount of data and may perform the 2-channel data processing to generate output image data O_DATA. Otherwise, output image data O_DATA may be generated in the second operating mode without performing the 3-channel data processing for the green, red and blue signals GS, RS and BS generated from each unit pixel 110 of pixel array 100 by performing the 2-channel data processing for first and second image signals IS1 and IS2 after converting the green, red and blue signals GS, RS and BS into first and second image signals IS1 and IS2 having the YUV422 format to reduce the amount of data. Thus, image processing device 10 comprising data processing unit 200e of FIG. 7 may control a quality of an image and an amount of consumed power based on the user's selection.

Referring again to FIG. 2, in another embodiment, data processing unit 200 may select two from color signals CS1, CS2 and CS3 provided from each of unit pixels 110 to generate the two image signals in the second operating mode. For example, each of unit pixels 110 generates green, red and blue signals GS, RS and BS corresponding to green, red and blue colors of incident light. In the second operating mode, data processing unit 200 may generate the green signal GS as first image signal IS1 and one of the red and blue signals RS and BS as second image signal IS2, and may process first and second image signals IS1 and IS2 in parallel to generate output image data O_DATA. In this case, data processing unit 200 may generate second image signal IS2 by alternately selecting the red and blue signals RS and BS for each of unit pixels 110 aligned in the form of a matrix in pixel array 100.

Various additional examples of data processing unit 200 will be described below with reference to FIGS. 8 to 11.

Figure 8:
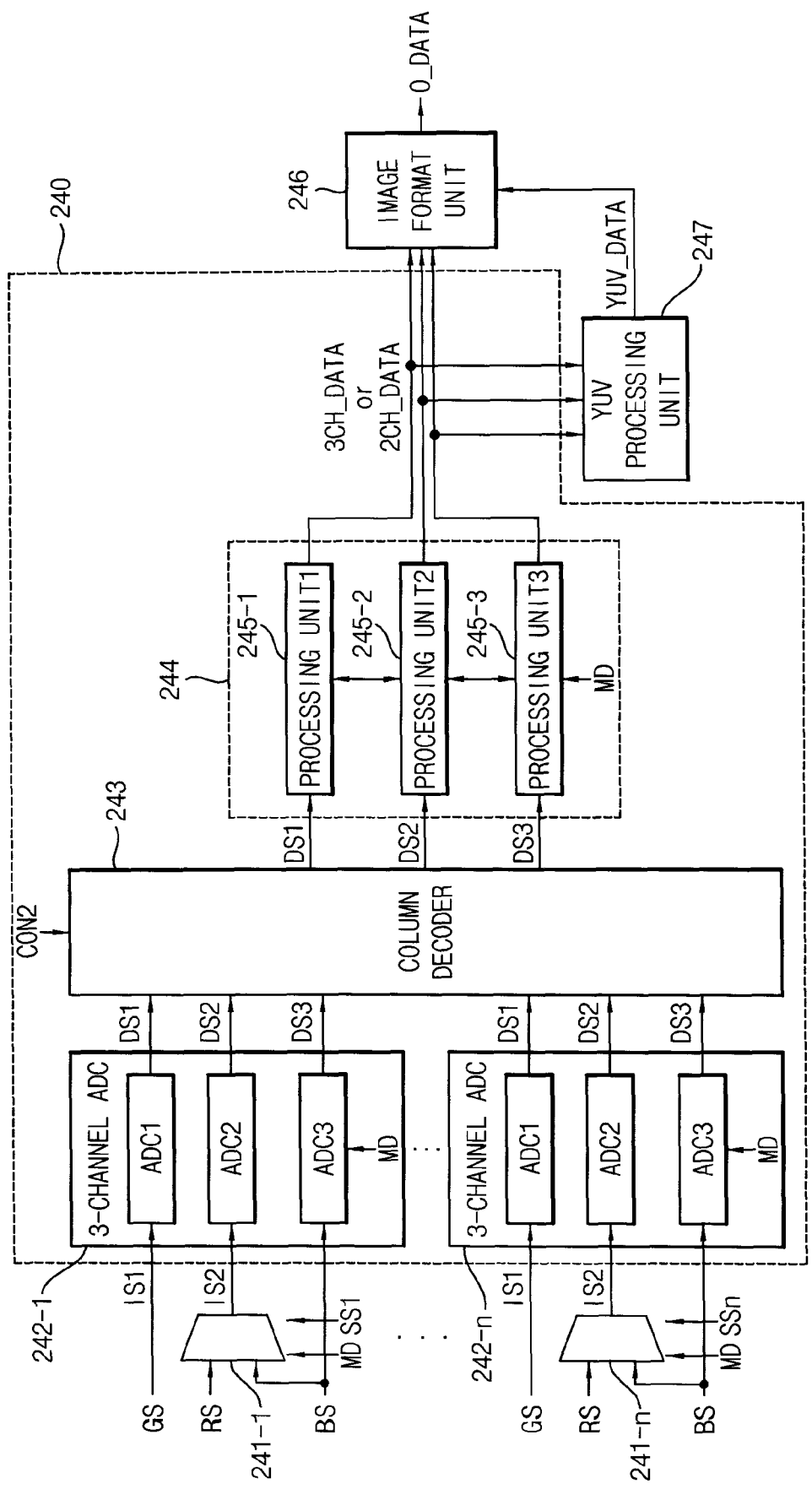
FIG. 8 is a block diagram illustrating a data processing unit in the image processing device of FIG. 1, according to another embodiment of the inventive concept.

FIG. 8 is a block diagram illustrating another example of data processing unit 200 in image processing device 10 of FIG. 1.

Referring to FIG. 8, data processing unit 200f comprises multiple multiplexers 241-1, and 241-n, a variable processing unit 240 and an image format unit 246, where n is greater than one.

Multiplexers 241-1, . . . and 241-n are connected to the columns of pixel array 100 to receive the red and blue signals RS and BS, respectively. Each of multiplexers 241-1, . . . and 241-n receives corresponding selection signals SS1, . . . and SSn and the control signal MD. Each of multiplexers 241-1, . . . and 241-n outputs red signal RS in the first operating mode where mode signal MD has the first logic level, and outputs one selected from the red and blue signals RS and BS based on the corresponding selection signals SS1, . . . and SSn in the second operating mode as second image signal IS2. For example, in the second operating mode, each of multiplexers 241-1, . . . and 241-n may output red signal RS as second image signal IS2 where the corresponding selection signal SS1, . . . and SSn has the first logic level and the blue signal BS as second image signal IS2 where the corresponding selection signal SS1, . . . and SSn has the second logic level.

The green and blue signals GS and BS provided from each of the columns of pixel array 100 may be directly input to variable processing unit 240.

Thus, variable processing unit 240 may receive the green, red and blue signals GS, RS and BS from the columns of pixel array 100 in the first operating mode. In the second operating mode, variable processing unit 240 receives green signals GS from the columns of pixel array 100 as first image signal IS1, and it receives output signals from multiplexers 241-1, . . . and 241-n as the second image operating mode. As described below, in the second operating mode, blue signals BS directly provided from pixel array 100 to variable processing unit 240 may be ignored.

In some embodiments, in the second operating mode, selection signals SS1, . . . and SSn, which are provided to multiplexers 241-1, . . . and 241-n connected to the columns of pixel array 100 adjacent to each other, may have different logic levels, and the logic levels of selection signals SS1, . . . and SSn may be inverted whenever the green, red and blue signals GS, RS and BS may be output from pixel array 100 in units of row. In this case, as shown of FIG. 9A, the green signals from all of unit pixels 110 of pixel array 100 may be sampled, and the resulting samples may be provided to variable processing unit 240 as first image signal IS1. In addition, the red and blue signals RS and BS from unit pixels 110 of pixel array 100 may be sampled in a mosaic, and the resulting samples may be provided to variable processing unit 240 as second image signal IS2.

In certain other embodiments, in the second operating mode, selection signals SS1, . . . and SSn, which are provided to multiplexers 241-1, . . . and 241-n connected to the odd columns of pixel array 100, may have the first logic level and selection signals SS1, . . . and SSn, which are provided to multiplexers 241-1, . . . and 241-n connected to the even columns of pixel array 100, may have the second logic level. In this case, as shown of FIG. 9B, green signals GS from all of unit pixels 110 of pixel array 100 may be sampled, and the resulting samples may be provided to variable processing unit 240 as first image signal IS1. In addition, red signals RS from unit pixels 110 connected to the odd columns of pixel array 100 and blue signals BS from unit pixels 110 connected to the even columns of pixel array 100 may be sampled, respectively and the samples may be provided to variable processing unit 240 as second image signal IS2.

Variable processing unit 240 comprises multiple 3-channel analog-digital conversion units 242-1, . . . and 242-n, a column decoder 243 and a 3-channel processing unit 244. Each of the 3-channel analog-digital conversion units 242-1, . . . and 242-n comprises first to third analog-digital converters ADC1, ADC2 and ADC3. In the first operating mode where mode signal MD has the first logic level, first to third analog-digital converters ADC1, ADC2 and ADC3 perform analog-to-digital conversion in parallel with respect to the green, red and blue signals GS, RS and BS to convert the green, red and blue signals GS, RS and BS into first to third digital signals DS1, DS2 and DS3. In the second operating mode, where mode signal MD has the second logic level, the third analog-digital converter ADC3 may be turned off and the first and second analog-digital converters ADC1 and ADC2 may perform an analog-to-digital conversion in parallel with respect to first and second image signals IS1 and IS2 to generate the first and second digital signals DS1 and DS2.

Column decoder 243 may sequentially output first to third digital signals DS1, DS2 and DS3 or the first and second digital signals DS1 and DS2 received from the 3-channel analog-digital conversion units 242-1, . . . and 242-n based on second control signal CON2 provided from control unit 300. 3-channel processing unit 244 comprises first to third processing units 245-1, 245-2 and 245-3.

In the first operating mode, where mode signal MD has the first logic level, 3-channel processing unit 244 may perform the 3-channel data processing for first to third digital signals DS1, DS2 and DS3 by using first to third processing units 245-1, 245-2 and 245-3, so that 3-channel processing unit 244 generates 3-channel data 3CH_DATA comprising three processing signals. The 3-channel data processing signifies the generation of three output signals by performing a data processing for three input signals independently from each other and/or dependently on each other. For example, the 3-channel processing unit 244 may perform a noise removing operation, a sharpening operation and a gamma correction for first to third digital signals DS1, DS2 and DS3.

In the second operating mode, where mode signal MD has the second logic level, 3-channel processing unit 244 may allow third processing unit 245-3 to be turned off and may perform the 2-channel data processing for the first and second digital signals DS1 and DS2 by using only the first and second processing units 245-1 and 245-2 to generate the 2-channel data 2CH_DATA comprising two processing signals. The 2-channel data processing signifies the generation of two output signals by performing the data processing for two input signals independently from each other and/or dependently on each other. For example, the 3-channel processing unit 244 may perform a noise removing operation, a sharpening operation and a gamma correction for the first and second digital signals DS1 and DS2.

Image format unit 246 generates output image data O_DATA by converting the format of the 3-channel data 3CH_DATA2 or the 2-channel data 2CH_DATA received from the 3-channel processing unit 244 into a format corresponding to a standard protocol. For example, image format unit 246 may generate output image data O_DATA by converting the format of the 3-channel data 3CH_DATA or the 2-channel data 2CH_DATA into a format corresponding to JPEG standard protocol. In some embodiments, image format unit 246 generates multiple output image data O_DATA by converting the format of the 3-channel data 3CH_DATA or the 2-channel data 2CH_DATA into formats corresponding to multiple standard protocols.

In some embodiments, data processing unit 200f further comprises a YUV processing unit 247. YUV processing unit 247 converts the format of the 3-channel data 3CH_DATA or the 2-channel data 2CH_DATA received from the 3-channel processing unit 244 into YUV format. YUV processing unit 247 converts the format of the 3-channel data 3CH_DATA into YUV444 format or YUV422 format where receiving the 3-channel data 3CH_DATA from the 3-channel processing unit 244, and it converts the format of the 2-channel data 2CH_DATA into YUV422 format where receiving the 2-channel data 2CH_DATA from the 3-channel processing unit 244. Further, YUV processing unit 247 may perform a data processing for the data converted into the YUV format to generate YUV data YUV_DATA. For example, YUV processing unit 247 may perform a sharpening operation and a color correcting operation. In this case, image format unit 246 may generate output image data O_DATA by converting the format of the 3-channel data 3CH_DATA or the 2-channel data 2CH_DATA received from the 3-channel processing unit 244 into a format corresponding to a standard protocol.

Data processing unit 200f may be integrated on one chip together with pixel array 100. 3-channel processing unit 244, YUV processing unit 247 and image format unit 246 in data processing unit 200f may be integrated on separated chips to form an ISP.

First analog-digital converter ADC1 and first processing unit 245-1 in variable processing unit 240 may constitute a first channel processing circuit. Second analog-digital converter ADC2 and second processing unit 245-2 in variable processing unit 240 may constitute a second channel processing circuit. Third analog-digital converter ADC3 and third processing unit 245-3 in variable processing unit 240 may constitute a third channel processing circuit. As described above, variable processing unit 240 may generate the 3-channel data 3CH_DATA comprising three processing signals by performing the 3-channel data processing for the green, red and blue signals GS, RS and BS by using the first to third channel processing circuits in the first operating mode. In the second operating mode, variable processing unit 240 may allow the third channel processing circuit to be turned off and may generate the 2-channel data 2CH_DATA comprising two processing signals by performing the 2-channel data processing for first and second image signals IS1 and IS2 by using only the first and second channel processing circuits. Thus, image processing device 10 comprising data processing unit 200f of FIG. 8 may provide a high-quality image in the first operating mode and may reduce the consumed power in the second operating mode.

Figure 10:
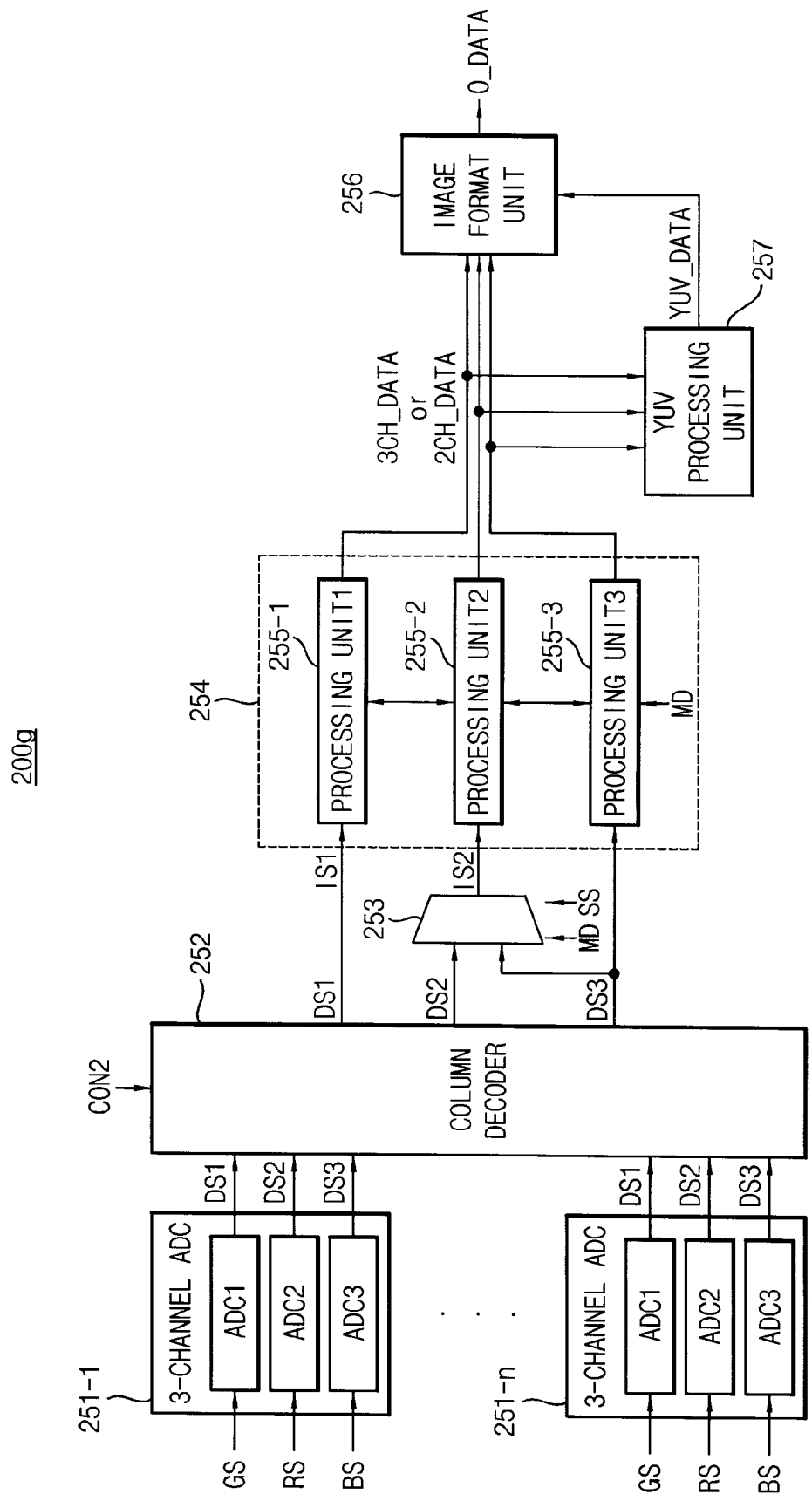
FIG. 10 is a block diagram illustrating a data processing unit in the image processing device of FIG. 1, according to another embodiment of the inventive concept.

FIG. 10 is a block diagram illustrating still another example of data processing unit 200 in image processing device 10 of FIG. 1.

Referring to FIG. 10, data processing unit 200g comprises multiple 3-channel analog-digital conversion units 251-1, . . . and 251-n, a column decoder 252, a multiplexer 253, a 3-channel processing unit 254, a YUV processing unit 257 and an image format unit 256, where n is greater than one. 3-channel analog-digital conversion units 251-1, . . . and 251-n, and column decoder 252 in data processing unit 200g of FIG. 10 are the same as those of data processing unit 200a of FIG. 2, so duplicated descriptions will be omitted.

Multiplexer 253 receives second and third digital signals DS2 and DS3 from column decoder 252, and it receives selection and mode signals SS and MD as the control signal. Multiplexer 253 outputs second digital signal DS2 as second image signal IS2 in the first operating mode where mode signal MD has the first logic level. In the second operating mode where mode signal MD has the second logic level, multiplexer 253 selects one of second and third digital signals DS2 and DS3 based on the logic level of selection signal SS and outputs the selected signal as second image signal IS2. For example, in the second operating mode, multiplexer 253 may output the second digital signal DS2 as second image signal IS2 where selection signal SS has the first logic level and may output the third digital signal DS3 as the third image signal IS3 where selection signal SS has the second logic level. In some embodiments, selection signal SS is provided from control unit 300. In some other embodiments, selection signal SS is generated within data processing unit 200g.

First and third digital signals DS1 and DS3 provided from column decoder 252 may be directly input to the 3-channel processing unit 254. Therefore, the 3-channel processing unit 254 may receive first to third digital signals DS1, DS2 and DS3 from column decoder 252 in the first operating mode. In the second operating mode, the 3-channel processing unit 254 may receive the first digital signal DS1 from column decoder 252 as first image signal IS1 and the output signal of multiplexer 253 as second image signal IS2. In the second operating mode, the third digital signal DS3 directly provided from column decoder 252 to the 3-channel processing unit 254 may be ignored.

The 3-channel processing unit 254 comprises the first to third processing units 255-1, 255-2 and 255-3. 3-channel processing units 254, YUV processing unit 257 and image format unit 256 in data processing unit 200g of FIG. 10 are the same as those of data processing unit 200f of FIG. 8, so duplicated descriptions will be omitted.

Comparing data processing unit 200g of FIG. 10 with data processing unit 200f of FIG. 8, multiplexers 241-1, . . . and 241-n are connected to front ends of the 3-channel analog-digital conversion units 242-1, . . . and 242-n in data processing unit 200f of FIG. 8, but only one multiplexer 253 is connected to a rear end of column decoder 252 in data processing unit 200g of FIG. 10. Thus, where image processing device 10 comprises data processing unit 200g of FIG. 10, the size and the consumed power of image processing device 10 may be more reduced.

Figure 11:
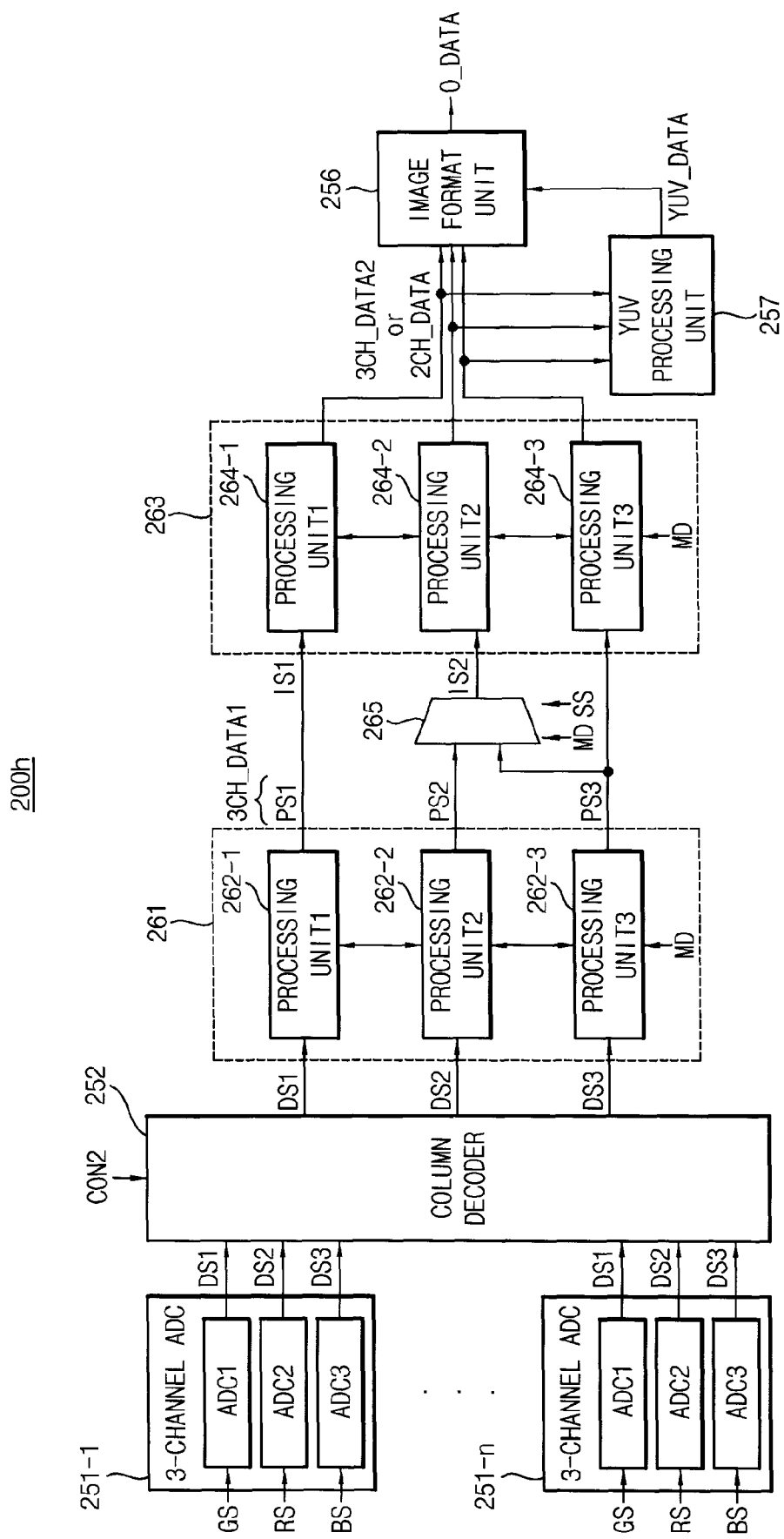
FIG. 11 is a block diagram illustrating a data processing unit in the image processing device of FIG. 1, according to another embodiment of the inventive concept.

FIG. 11 is a block diagram illustrating still another example of data processing unit 200 in image processing device 10 of FIG. 1.

Referring to FIG. 11, data processing unit 200h comprises multiple 3-channel analog-digital conversion units 251-1, . . . and 251-n, a column decoder 252, a first 3-channel processing unit 261, a second 3-channel processing unit 263, a multiplexer 265, a YUV processing unit 257 and an image format unit 256, where n is greater than one. 3-channel analog-digital conversion units 251-1, . . . and 251-n, and column decoder 252 in data processing unit 200h of FIG. 11 are the same as those of data processing unit 200a of FIG. 2, so duplicated descriptions will be omitted.

First 3-channel processing unit 261 comprises first to third processing units 262-1, 262-2 and 262-3. Regardless of the operating mode, first 3-channel processing unit 261 performs the 3-channel data processing for first to third digital signals DS1, DS2 and DS3 by using the first to third processing units 262-1, 262-2 and 262-3 to generate first 3-channel data 3CH_DATA1 comprising first to third processing signals PS1, PS2 and PS3. First 3-channel processing unit 261 may partially perform the 3-channel data processing performed by the 3-channel processing unit 244 in data processing unit 200f of FIG. 8. For example, first 3-channel processing unit 261 may perform a noise removing operation for first to third digital signals DS1, DS2 and DS3 to generate first 3-channel data 3CH_DATA1 comprising the first to third processing signals PS1, PS2 and PS3.

Multiplexer 265 receives second and third processing signals PS2 and PS3 from first 3-channel processing unit 261, and it receives the selection and mode signals SS and MD as control signal. multiplexer 265 outputs second processing signal PS2 in the first operating mode where mode signal MD has the first logic level. In the second operating mode, where mode signal MD has the second logic level, multiplexer 265 selects one signal from second and third processing signals PS2 and PS3 based on the logic level of selection signal SS and outputs the selected signal as second image signal IS2. For example, in the second operating mode, multiplexer 265 may output the second processing signal PS2 as second image signal IS2 where selection signal SS has the first logic level and may output third processing signal PS3 as second image signal IS2 where selection signal SS has the second logic level. In some embodiments, selection signal SS is provided from control unit 300. In some other embodiments, selection signal SS is generated within data processing unit 200h.

First and third processing signals PS1 and PS3 provided from first 3-channel processing unit 261 may be directly input to second 3-channel processing unit 263. Therefore, second 3-channel processing unit 263 may receive the first to third processing signals PS1, PS2 and PS3 from first 3-channel processing unit 261 in the first operating mode. In the second operating mode, second 3-channel processing unit 263 may receive the first processing signal PS1 from first 3-channel processing unit 261 as first image signal IS1 and may receive the output signal of multiplexer 265 as second image signal IS2. In the second operating mode, the third processing signal PS3 directly provided from first 3-channel processing unit 261 to second 3-channel processing unit 263 may be ignored.

Second 3-channel processing unit 263 comprises the first to third processing units 264-1, 264-2 and 264-3.

In the first operating mode, where mode signal MD has the first logic level, second 3-channel processing unit 263 may perform the 3-channel data processing for first 3-channel data 3CH_DATA1 comprising the first to third processing signals PS1, PS2 and PS3 by using the first to third processing units 264-1, 264-2 and 264-3. The 3-channel data processing signifies the generation of three output signals by performing a data processing for three input signals independently from each other and/or dependently on each other. Second_3-channel processing unit 263 performs the 3-channel data processing performed by the 3-channel processing unit 244 in data processing unit 200f of FIG. 8, except for a portion of the 3-channel data processing performed by first 3-channel processing unit 261. For example, second 3-channel processing unit 263 may perform the sharpening operation and the gamma correction for first 3-channel data 3CH_DATA1 to generate second 3-channel data 3CH_DATA2.

In the second operating mode, where mode signal MD has the second logic level, second 3-channel processing unit 263 may allow third processing unit 264-3 to be turned off and may perform the 2-channel data processing for first and second image signals IS1 and IS2 by using only the first and second processing units 264-1 and 264-2 to generate the 2-channel data 2CH_DATA comprising two processing signals. The 2-channel data processing signifies the generation of two output signals by performing the data processing for two input signals independently from each other and/or dependently on each other. For example, second 3-channel processing unit 263 may perform a noise removing operation, a sharpening operation and a gamma correction for first and second image signals IS1 and IS2.

YUV processing unit 257 and image format unit 256 in data processing unit 200h of FIG. 11 are the same as those of data processing unit 200f of FIG. 8, so duplicated descriptions will be omitted.

As described above, in the first operating mode, image processing device 10 comprising data processing unit 200h performs 3-channel data processing for the green, red and blue signals GS, RS and BS generated from each unit pixel 110 of pixel array 100 to generate output image data O_DATA, so that an high-quality image may be provided. In addition, in the second operating mode if output image data O_DATA are generated through the 2-channel data processing while third processing unit 264-3 of second 3-channel processing unit 263 is turned off after the 3-channel data processing for the green, red and blue signals GS, RS and BS generated from each unit pixel 110 of pixel array 100 is partially performed to reduce the amount of data, the power consumption may be slightly increased as compared with that of the second operating mode of image processing device 10 comprising data processing unit 200a of FIG. 2, but the high-quality image can be provided.

Figure 12:
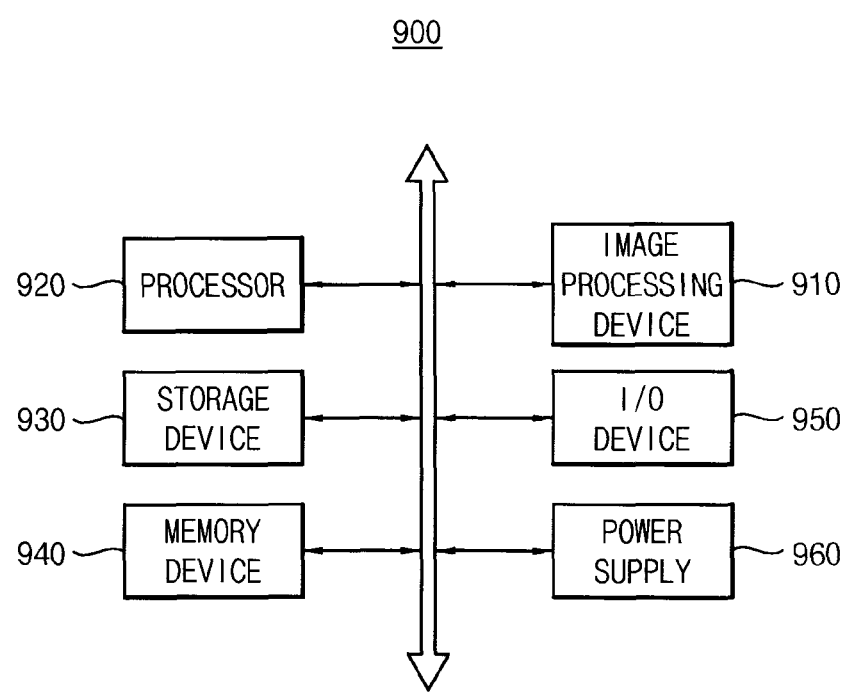
FIG. 12 is a block diagram illustrating a computing system comprising an image sensor, according to an embodiment of the inventive concept.

FIG. 12 is a block diagram illustrating a computing system 900 comprising an image sensor, according to an embodiment of the inventive concept.

Referring to FIG. 12, computing system 900 comprises an image processing device 910, a processor 920 and a storage device 930. Image processing device 910 generates output image data corresponding to incident light. Storage device 930 stores the output image data. Processor 920 controls operations of image processing device 910 and storage device 930.

Computing system 900 further comprises a memory device 940, an input/output device 950, and a power supply 960. Although not illustrated in FIG. 12, computing system 900 may further comprise ports that communicate with a video card, a sound card, a memory card, a universal serial bus (USB) device, or other electronic devices.

Processor 920 performs various calculations or tasks. In some embodiments, processor 920 may be a microprocessor or a CPU. Processor 920 typically communicates with storage device 930, memory device 940 and the input/output device 950 via an address bus, a control bus, and/or a data bus. In some embodiments, processor 920 is coupled to an extended bus, such as a peripheral component interconnection (PCI) bus.

Storage device 930 typically comprises a non-volatile memory device such as a flash memory device, a solid state drive (SSD), a hard disk drive (HDD), a compact disk read-only memory (CD-ROM) drive, etc.

Memory device 940 may store data required for an operation of electronic device 900. Memory device 940 may be, e.g., a dynamic random access memory (DRAM), a static random access memory (SRAM), or a non-volatile memory, such as an erasable programmable read-only memory (EPROM), an electrically erasable programmable read-only memory (EEPROM), a flash memory, etc. Input/output device 950 typically comprises a keyboard, a mouse, a printer, a display device, etc. Power supply 960 supplies operational power.

Image processing device 910 may be connected to processor 920 through one or more of the above buses or other communication links to communicate with processor 920.

Image processing device 910 comprises a pixel array and a data processing unit. The pixel array comprises multiple unit pixels, and each of the unit pixels may generate multiple color signals in response to an incident light. The data processing unit may generate output image data by processing the color signals in parallel in a first operating mode, and generate two image signals for each unit pixel based on the color signals and generate the output image data by processing the two image signals in parallel in a second operating mode.

Image processing device 910 may be embodied with image processing device 10 of FIG. 1. A structure and an operation of image processing device 10 of FIG. 1 are described above with reference to FIGS. 1 to 11. Therefore, a detailed description of image processing device 910 will be omitted.

Image processing device 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

In some embodiments, image processing device 910 is integrated with processor 920 in one chip, or image processing device 910 and processor 920 may be implemented as separate chips.

Computing system 900 may be any type of computing system using an image sensor. For example, computing system 900 may comprise a digital camera, a mobile phone, a smart phone, a portable multimedia player (PMP), a personal digital assistant (PDA), etc.

Figure 13:
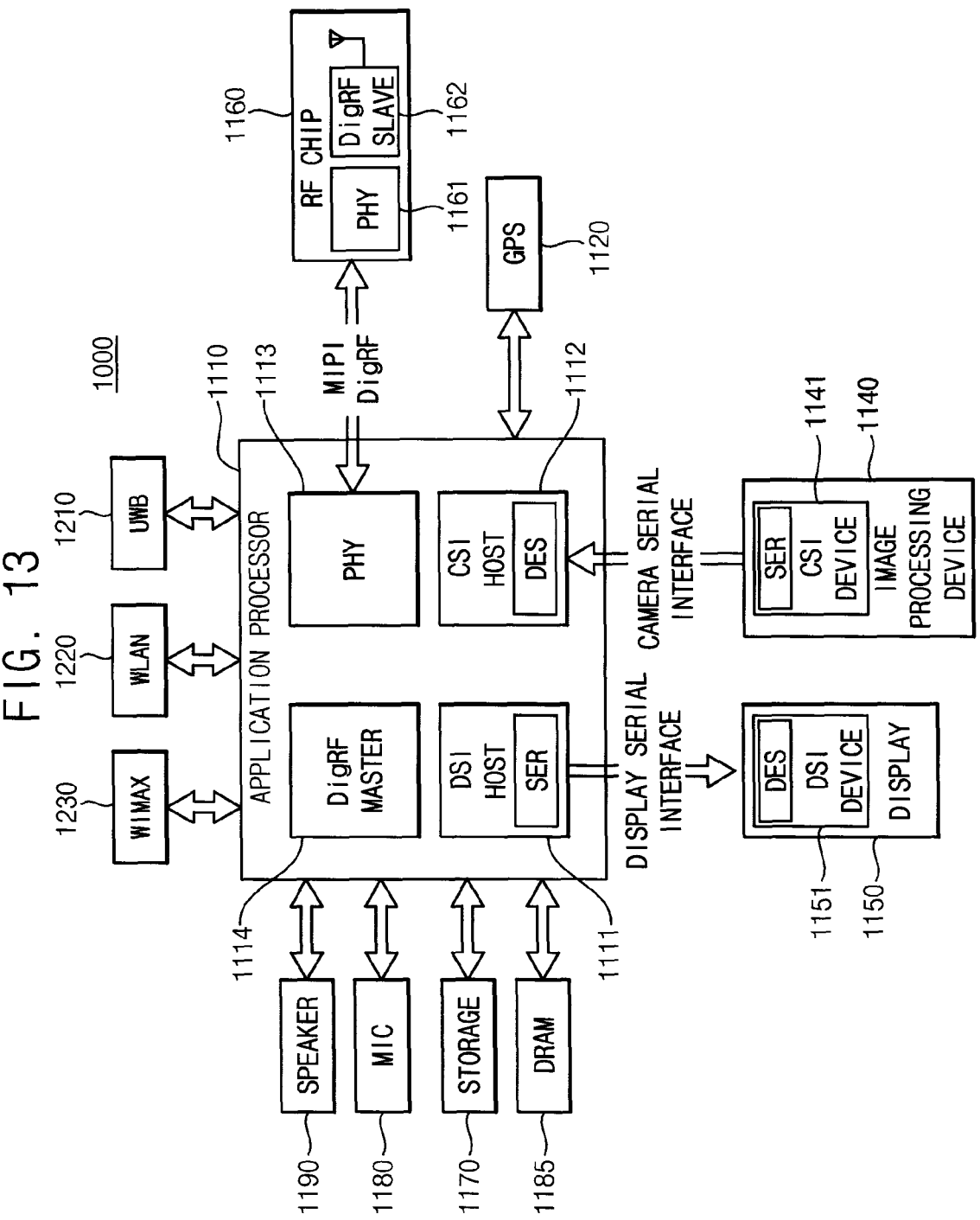
FIG. 13 is a block diagram illustrating an interface used in the computing system of FIG. 12, according to an embodiment of the inventive concept.

FIG. 13 is a block diagram illustrating an example of an interface used in the computing system of FIG. 12.

Referring to FIG. 13, a computing system 1000 may be implemented by a data processing device (e.g., a cellular phone, a personal digital assistant, a portable multimedia player, a smart phone, etc.) that uses or supports a mobile industry processor interface (MIPI) interface. Computing system 1000 comprises an application processor 1110, an image sensor 1140, a display device 1150, etc.

A CSI host 1112 of application processor 1110 may perform a serial communication with a CSI device 1141 of image sensor 1140 via a camera serial interface (CSI). In some embodiments, CSI host 1112 comprises a deserializer (DES), and CSI device 1141 comprises a serializer (SER). A display serial interface (DSI) host 1111 of application processor 1110 may perform a serial communication with a DSI device 1151 of display device 1150 via a DSI. In some embodiments, DSI host 1111 comprises a serializer (SER), and DSI device 1151 comprises a deserializer (DES).

Computing system 1000 may further comprise a radio frequency (RF) chip 1160 performing a communication with application processor 1110. A physical layer (PHY) 1113 of computing system 1000 and a physical layer (PHY) 1161 of RF chip 1160 may perform data communications based on a MIPI DigRF. Application processor 1110 may further comprise a DigRF MASTER 1114 that controls the data communications according to the MIPI DigRF of PHY 1161, and RF chip 1160 may further comprise a DigRF SLAVE 1162 controlled by DigRF MASTER 1114.

Computing system 1000 may further comprise a global positioning system (GPS) 1120, a storage 1170, a MIC 1180, a DRAM device 1185, and a speaker 1190. In addition, computing system 1000 may perform communications using an ultra wideband (UWB) 1210, a wireless local area network (WLAN) 1220, a worldwide interoperability for microwave access (WIMAX) 1230, etc. However, the structure and the interface of computing system 1000 are not limited thereto.

The foregoing is illustrative of embodiments and is not to be construed as limiting thereof. Although a few embodiments have been described, those skilled in the art will readily appreciate that many modifications are possible in the embodiments without departing from the scope of the inventive concept as defined in the claims.

What is claimed is:

1. An image processing device, comprising:
   a pixel array comprising multiple unit pixels each configured to generate multiple color signals in response to incident light; and
   a data processing unit configured to generate output image data by processing all of the color signals of a pixel unit in parallel in a first operating mode, and further configured to generate two image signals for each unit pixel based on the color signals and to generate the output image data by processing the two image signals in parallel in a second operating mode, wherein the two image signals comprise first and second image signals, and wherein the data processing unit is configured to provide a first of the multiple color signals as the first image signal, and to select one of second and third of the multiple color signals as the second image signal in the second operating mode.

2. The image processing device of claim 1, wherein the first operating mode is a high-quality imaging mode, and the second operating mode is a power saving mode.

3. The image processing device of claim 1, wherein each of the unit pixels generates green, red and blue signals corresponding to green, red and blue colors as the color signals, respectively, in response to the incident light, and wherein the first image signal corresponds to the green signal, and the second image signal corresponds to one of the red and blue signals.

4. The image processing device of claim 3, wherein the data processing unit comprises:

multiple multiplexers connected to columns of the pixel array, respectively, each of the multiplexers configured to output the red signal in the first operating mode and output one of the red and blue signals as the second image signal based on a logic level of a selection signal in the second operating mode;

a variable processing unit comprising first to third channel processing circuits, the variable processing unit configured to generate 3 channel data comprising three processing signals by performing a 3-channel data processing for the green, red and blue signals using the first to third channel processing circuits in the first operating mode, the variable processing unit configured to turn off the third channel processing circuit and generate 2 channel data comprising two processing signals by performing a 2-channel data processing for the first and second image signals using the first and second channel processing circuits in the second operating mode; and an image format unit configured to generate the output image data by converting a format of one of the 3-channel data and the 2-channel data into a format corresponding to a standard protocol.

5. The image processing device of claim 4, wherein the selection signals provided to multiplexers connected to columns adjacent to each other in the pixel array in the second operating mode have different logic levels.

6. The image processing device of claim 3, wherein the data processing unit comprises:

multiple 3-channel analog-digital conversion units connected to columns of the pixel array, respectively, each of the 3-channel analog-digital conversion units configured to generate first to third digital signals by performing an analog-to-digital conversion in parallel with respect to the green, red and blue signals;

a first 3-channel processing unit configured to generate first 3-channel data comprising first to third processing signals by performing a 3-channel data processing for the first to third digital signals;

a multiplexer configured to output the second processing signal in the first operating mode, and further configured to output one of the second and third processing signals as the second image signal based on a logic level of a selection signal in the second operating mode;

a second 3-channel processing unit comprising first to third processing units, the second 3-channel processing unit configured to generate second 3-channel data comprising three processing signals by performing a 3-channel data processing for the first to third processing signals using the first to third processing units in the first operating mode, the second 3-channel processing unit configured to turn off the third processing unit and generate 2-channel data comprising two processing signals by performing a 2-channel data processing for the first processing signal and the second image signal using the first and second processing units in the second operating mode; and an image format unit configured to generate the output image data by converting a format of one of the second 3-channel data and the 2-channel data into a format corresponding to a standard protocol.

7. A computing system, comprising:

an image processing device configured to generate output image data corresponding to incident light;

a storage device configured to store the output image data; and a processor configured to control the image processing device and the storage device, wherein the image processing device comprises a pixel array comprising multiple unit pixels each configured to generate multiple color signals in response to the incident light; and a data processing unit configured to generate the output image data by processing all of the multiple color signals of a pixel unit in parallel in a first operating mode, and further configured to generate two image signals for each unit pixel based on the multiple color signals and to generate the output image data by processing the two image signals in parallel in a second operating mode, wherein the two image signals comprise first and second image signals having a YUV format, and wherein the data processing unit is configured to provide a Y component as the first image signal and to select one of a U component and a V component as the second image signal in the second operating mode.

8. The image processing device of claim 7, wherein each of the unit pixels generates green, red, and blue signals corresponding to green, red and blue colors, respectively, in response to the incident light.

9. The image processing device of claim 8, wherein the data processing unit comprises:

multiple 3-channel analog-digital conversion units connected to columns of the pixel array, respectively, each of the 3-channel analog-digital conversion units configured to generate first to third digital signals by performing an analog-to-digital conversion in parallel with respect to the green, red and blue signals;

a 3-channel processing unit configured to generate 3-channel data comprising three processing signals by performing a 3-channel data processing for the first to third digital signals in the first operating mode, and further configured to be turned off in the second operating mode;

a first data reduction unit configured to be turned off in the first operating mode, and further configured to convert the first to third digital signals into the YUV format to generate a Y signal, a U signal and a V signal and to generate the first image signal and the second image signal as the Y signal and one of the U and V signals, respectively, in the second operating mode;

a 2-channel processing unit configured to generate 2-channel data comprising two processing signals by performing a 2-channel data processing for the first and second image signals in the second operating mode; and an image format unit configured to generate the output image data by converting a format of one of the 3-channel data and the 2-channel data into a format corresponding to a standard protocol.

10. The image processing device of claim 9, wherein the first data reduction unit alternately selects the U signal or the V signal where the first to third digital signals are received to output the selected one as the second image signal.

11. The image processing device of claim 9, further comprising:

a second data reduction unit configured to convert the 3-channel data into the YUV format to generate a second Y signal, a second U signal and a second V signal and to generate a third image signal and a fourth image signal as the second Y signal and one of the second U and V signals, respectively, in the first operating mode, and further configured to be turned off in the second operating mode, wherein the 2-channel processing unit performs the 2-channel data processing for the third and fourth image signals in the first operating mode to generate the 2-channel data.

12. The image processing device of claim 8, wherein the data processing unit comprises:

multiple 3-channel analog-digital conversion units connected to columns of the pixel array, respectively, each of the 3-channel analog-digital conversion units configured to generate first to third digital signals by performing an analog-to-digital conversion in parallel with respect to the green, red and blue signals;

a first 3-channel processing unit configured to generate first 3-channel data comprising three processing signals by performing a 3-channel data processing for the first to third digital signals;

a second 3-channel processing unit configured to generate second 3-channel data comprising three additional processing signals by performing the 3-channel data processing for the first 3-channel data in the first operating mode, and further configured to be turned off in the second operating mode;

a data reduction unit configured to be turned off in the first operating mode, and further configured to convert the first 3-channel data into the YUV format to generate a Y signal, a U signal and a V signal and to generate the first image signal and the second image signal as the Y signal and one of the U and V signals, respectively, in the second operating mode;

a 2-channel processing unit configured to generate 2-channel data comprising two processing signals by performing a 2-channel data processing for the first and second image signals in the second operating mode; and an image format unit configured to generate the output image data by converting a format of one of the second 3-channel data and the 2-channel data into a format corresponding to a standard protocol.

13. The image processing device of claim 8, wherein the data processing unit comprises:

multiple 3-channel analog-digital conversion units connected to columns of the pixel array, respectively, each of the 3-channel analog-digital conversion units configured to generate first to third digital signals by performing an analog-to-digital conversion in parallel with respect to the green, red and blue signals;

a first 3-channel processing unit configured to be turned on based on an operating mode and a power control signal, and to generate first 3-channel data comprising three processing signals by performing a 3-channel data processing for the first to third digital signals;

a second 3-channel processing unit configured to be turned off in the second operating mode, and further configured to generate second 3-channel data by performing the 3-channel data processing for the first 3-channel data in the first operating mode;

a multiplexer configured to output the second 3-channel data in the first operating mode, and further configured to output the first 3-channel data where the power control signal has a first logic level and to output the first to third digital signals where the power control signal has a second logic level in the second operating mode;

a data reduction unit configured to convert data received from the multiplexer into the YUV format to generate a second Y signal, a second U signal and a second V signal and to generate the first image signal and the second image signal as the second Y signal and one of the second U and V signals, respectively;

a 2-channel processing unit configured to generate 2-channel data comprising two processing signals by performing a 2-channel data processing for the first and second image signals; and an image format unit configured to generate the output image data by converting a format of one of the second 3-channel data and the 2-channel data into a format corresponding to a standard protocol.

14. An image processing device, comprising:

a pixel array comprising multiple unit pixels each configured to generate "n" color signals in response to incident light, where n is greater than one; and a data processing unit configured to generate output image data by processing all of the "n" color signals of a pixel unit in parallel in a first operating mode, and further configured to generate "m" image signals for each unit pixel based on the "n" color signals and to generate the output image data by processing the m image signals in parallel in a second operating mode, where m is a positive number less than n, wherein the data processing unit comprises multiple 3-channel analog-digital conversion units connected to columns of the pixel array, respectively, each of the 3-channel analog-digital conversion units configured to generate first to third digital signals by performing an analog-to-digital conversion in parallel with respect to the "n" color signals;

a 3-channel processing unit configured to generate 3-channel data comprising three processing signals by performing a 3-channel data processing for the first to third digital signals in the first operating mode, and further configured to be turned off in the second operating mode;

a first data reduction unit configured to be turned off in the first operating mode, and further configured to convert the first to third digital signals into a YUV format to generate a Y signal, a U signal and a V signal and to generate the first image signal and the second image signal as the Y signal and one of the U and V signals, respectively, in the second operating mode;

a 2-channel processing unit configured to generate 2-channel data comprising two processing signals by performing a 2-channel data processing for the first and second image signals in the second operating mode; and an image format unit configured to generate the output image data by converting a format of one of the 3-channel data and the 2-channel data into a format corresponding to a standard protocol.

15. The image processing device of claim 14, wherein the first operating mode is a high-quality imaging mode, and the second operating mode is a power saving mode.

16. The image processing device of claim 14, wherein each of the unit pixels generates green, red, and blue signals corresponding to green, red and blue colors, respectively, as the "n" color signals in response to the incident light.

* * * * *